(12) United States Patent
Hirai et al.

(10) Patent No.: US 7,738,340 B2
(45) Date of Patent: Jun. 15, 2010

(54) OPTICAL DISK APPARATUS WITH ABERRATION CORRECTING PART, AND OPTICAL DISK

(75) Inventors: Hideaki Hirai, Kanagawa (JP); Tetsuya Ogata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1093 days.

(21) Appl. No.: 10/994,656

(22) Filed: Nov. 23, 2004

(65) Prior Publication Data

US 2005/0122879 A1 Jun. 9, 2005

(30) Foreign Application Priority Data

Nov. 27, 2003 (JP) ............................. 2003-396448
Mar. 9, 2004 (JP) ............................. 2004-064905
Mar. 9, 2004 (JP) ............................. 2004-064909

(51) Int. Cl.
*G11B 7/09* (2006.01)
*G11B 7/00* (2006.01)

(52) U.S. Cl. ........................................ 369/94; 369/47.4

(58) Field of Classification Search ................... 369/94, 369/275.1–275.5

See application file for complete search history.

(56) References Cited

U.S. PATENT DOCUMENTS

| | | | |
|---|---|---|---|
| 5,408,453 A | | 4/1995 | Holtslag et al. |
| 5,608,715 A * | | 3/1997 | Yokogawa et al. ............. 369/94 |
| 5,625,609 A * | | 4/1997 | Latta et al. ..................... 369/94 |
| 6,172,957 B1 * | | 1/2001 | Ogasawara ................... 369/94 |
| 6,545,958 B1 | | 4/2003 | Hirai et al. |
| 6,728,179 B1 * | | 4/2004 | Nakano et al. .......... 369/112.24 |
| 6,934,226 B2 | | 8/2005 | Yasuda et al. |
| 6,974,939 B1 * | | 12/2005 | Yamada ................. 369/112.24 |
| 7,006,411 B2 | | 2/2006 | Hirai |
| 7,274,646 B2 | | 9/2007 | Hirai |
| 2002/0012313 A1 * | | 1/2002 | Kimura et al. .......... 369/112.24 |
| 2002/0093902 A1 | | 7/2002 | Hirai et al. |
| 2002/0191502 A1 | | 12/2002 | Hirai |
| 2003/0072247 A1 | | 4/2003 | Hirai |
| 2003/0151999 A1 | | 8/2003 | Hirai et al. |
| 2003/0202437 A1 * | | 10/2003 | Yamada et al. ........... 369/44.29 |

(Continued)

FOREIGN PATENT DOCUMENTS

JP 8-96406 4/1996

(Continued)

OTHER PUBLICATIONS

Machine-assisted translation of JP 08-096406.*

*Primary Examiner*—William J Klimowicz
*Assistant Examiner*—Nathan Danielsen
(74) *Attorney, Agent, or Firm*—Dickstein Shapiro LLP

(57) ABSTRACT

An optical system has an objective lens condensing a light beam from the light source on a recording layer selected from the plurality of recording layers of the optical disk, and leading a returning light beam reflected by the selected recording layer to a predetermined position; an aberration detecting part detecting a physical amount relative to spherical aberration based on an output signal of the photodetector; an aberration correcting part correcting the spherical aberration based on the physical amount; and a processing device carrying out at least the information reproduction o from among information recording, information reproduction and information deletion with the use of the output signal of the photodetector.

10 Claims, 12 Drawing Sheets

U.S. PATENT DOCUMENTS

| | | |
|---|---|---|
| 2003/0214898 A1 | 11/2003 | Ogata et al. |
| 2003/0227859 A1 | 12/2003 | Hirai |
| 2004/0037197 A1* | 2/2004 | Fujiune et al. ................ 369/94 |

FOREIGN PATENT DOCUMENTS

| | | |
|---|---|---|
| JP | 9-54981 | 2/1997 |
| JP | 10-500525 | 1/1998 |
| JP | 10-106012 | 4/1998 |
| JP | 10-269611 | 10/1998 |
| JP | 11-016207 | 1/1999 |
| JP | 2000-137927 | 5/2000 |
| JP | 2000-258741 | 9/2000 |
| JP | 2002-334476 | 11/2002 |
| JP | 2002-373441 | 12/2002 |
| JP | 2002-373444 | 12/2002 |
| JP | 2003-016660 | 1/2003 |
| JP | 2003-091838 | 3/2003 |
| JP | 2003-141771 | 5/2003 |
| JP | 2003-177312 | 6/2003 |

* cited by examiner

LASER LIGHT

OPTICAL DISK APPARATUS WITH ABERRATION CORRECTING PART, AND OPTICAL DISK

BACKGROUND OF THE INVENTION

1. Field of the Invention

The present invention relates to an optical disk apparatus and an optical disk, and, specifically, to an optical disk apparatus carrying out at least information reproduction from among information recording, information reproduction and information deletion on an optical disk having a plurality of recording layers, and an optical disk on which at least information reproduction from among information recording, information reproduction and information deletion is carried out with the use of the optical disk apparatus.

2. Description of the Related Art

Recently, along with progress of digital technology and improvement of data compression technology, an optical disk such as a DVD (digital versatile disk) takes an attention as an information recording medium storing information such as music, movie, photograph, computer software or such (which may be referred to as 'contents', hereinafter). Then, thanks to price reduction thereof, an optical disk apparatus used to handle the optical disk as an information recording medium has wide spread.

As an amount of the contents tends to increase year after year, increase in a recording capacity of the optical disk is demanded. In order to increase the recording capacity of the optical disk, one method is to increase a recording density and another method is to increase the number of recording layers included in the optical disk.

As to the increase in the recording density of the optical disk, study has been proceeded with for shortening a wavelength of a light beam applied to the optical disk as well as reducing a diameter of a beam spot (spot diameter) formed on the recording layer by means of an objective lens. Then, standardization for a next generation DVD configured to have a light beam of approximately 400 nm applied thereto (which may be called a 'blue DVD'), which is further shorter wavelength than a wavelength of a light beam of approximately 660 nm which a current DVD is configured to have applied thereto has been proceeded with eagerly.

On the other hand, as to the increase of the number of recording layers in a single optical disk, development of an optical disk having a plurality of recording layers (referred to as 'multi-layer disk' hereinafter), and development of an optical disk apparatus configured to access the multi-layer disk have been proceeded with actively (see Japanese Laid-open Patent Applications Nos. 8-96406 and 9-54981, for example). As to the multi-layer disk, spacing between recording layers (inter-layer distance) is an essential matter. When the inter-layer distance is short, so-called crosstalk may occur, in which not only a signal from an intended recording layer but also a signal from another recording layer may be included in a returning light beam from the multi-layer disk at a high level. In such a case, as a result, an S/N of a reproduced signal may degrade. On the other hand, when the inter-layer distance is large, a signal from the intended recording layer may degrade due to influence of spherical aberration. For example, in a one-side two-layer DVD-ROM, the distance between two recording layers is defined as being 55±15 μm. According to Japanese Laid-open Patent Application No. 8-96406, the upper limit of the distance between recording layers is defined as being $7.5\ n^3\lambda/\{(n^2-1)NA^4\}$, where n denotes an equivalent refractive index between the recording layers; $\lambda$ denotes a wavelength of an applied light beam; and NA denotes a numerical aperture of an objective lens.

Then, by combining the shortening of a wavelength of a light beam and increase in the number of recording layers, remarkable increase in the recording capacity may be expected. However, when the wavelength of the light beam is shortened, the upper limit of the distance between two recording layers is reduced further than that of the above-mentioned one-side two-layer DVD-ROM (70 μm). As a result, it is difficult to use a conventional manufacturing apparatus for manufacturing such a type of an optical disk, and the cost of the optical disk may increase much.

SUMMARY OF THE INVENTION

The present invention has been devised to solve this problem, and a first object of the present invention is to provide an optical disk apparatus by which access to an optical disk having a plurality of recording layers can be carried out stably with high accuracy.

A second object of the present invention is to provide an optical disk having a large recording capacity at a reduced cost.

According to a first aspect of the present invention, an optical disk apparatus carrying out at least information reproduction from among information recording, information reproduction and information deletion on an optical disk having a plurality of recording layers, includes: a light source; an optical system comprising an objective lens condensing a light beam from the light source on a recording layer selected from the plurality of recording layers of the optical disk, and leading a returning light beam reflected by the selected recording layer to a predetermined position; a photodetector disposed at the predetermined position and receiving the returning light beam; an aberration detecting part detecting a physical amount relative to spherical aberration based on an output signal of the photodetector; an aberration correcting part correcting the spherical aberration based on the physical amount; and a processing device carrying out at least information reproduction from among information recording, information reproduction and information deletion with the use of the output signal of the photodetector.

The 'physical amount relative to spherical aberration' may be, not only spherical aberration itself, but also a physical amount which spherical aberration can be transformed from, a physical amount varying according to a variation of spherical aberration, or such.

By this configuration, in prior to actual access to, such as that for information reproduction from, the optical disk, the abrasion detecting part detects the physical amount relative to spherical aberration, and, based on the thus-detected physical amount, the aberration correcting part carries out aberration correction so as to control the spherical aberration to less than a predetermined value. As a result, even when any recording layer is selected from among the plurality of recording layers, a beam spot superior in terms of shape quality is stably produced on the relevant recording layer. As a result, it becomes possible to carry out access to the optical disk having the plurality of recording layers and having a large recording capacity, stably with high accuracy.

In this case, according to a second aspect of the present invention, the objective lens may be set in such a manner that wavefront aberration may become minimum approximately at a central position between two recording layers located at both ends of the plurality of recording layers with respect to an optical axis of the objective lens when the entrance light beam comprises an approximately parallel beam.

Further, according to a third aspect of the present invention, in any one of the first and second aspects of the present invention, the aberration correcting part may be configured to include a positive lens and a negative lens disposed on a light path lying between the light source and the objective lens, and the spherical aberration may be corrected as a result of a distance between the positive lens and the negative lens being adjusted.

Further, according to a fourth aspect of the present invention, in any one of the above-mentioned first and second aspects of the present invention, the aberration correcting part may be configured to include a coupling lens disposed on a light path lying between the light source and the objective lens, and the spherical aberration may be corrected as a result of a position of the coupling lens with respect to an optical axis direction thereof being adjusted.

Further, according to a fifth aspect of the present invention, in any one of the above-mentioned first and second aspects of the present invention, the aberration correcting part may be configured to include an electrooptic device having a refractive index distribution varying according to an applied voltage, disposed on a light path lying between the light source and the objective lens, and the spherical aberration may be corrected as a result of the refractive index distribution being adjusted.

Further, in this case, according to a sixth aspect of the present invention, the electrooptic device may be made of a liquid crystal device.

Further, in this case, according to a seventh aspect of the present invention, in the fifth aspect of the present invention, the electrooptic device may be made of an optical device including an electrooptic crystal.

Further, according to an eighth aspect of the present invention, in any one of the above-mentioned first through seventh aspects of the present invention, the aberration correcting part may be configured to detect the physical amount relative to the spherical aberration based on defocus information of the returning light beam obtained from the output signal of the photodetector.

Further, according to a ninth aspect of the present invention, in any one of the first through seventh aspect of the present invention, the aberration correcting part may be configured to detect the physical amount relative to the spherical aberration based on an amplitude of an RF signal or a tracking error signal obtained from the output signal of the photodetector.

According to a tenth aspect of the present invention, an optical disk apparatus carrying out at least information reproduction, from among information recording, information reproduction and information deletion, on an optical disk having a plurality of recording layers, includes: a light source; an optical system comprising an objective lens condensing a light beam coming from the light source on a recording layer selected from the plurality of recording layers of the optical disk, and leading a returning light beam reflected by the selected recording layer to a predetermined position; a photodetector disposed at the predetermined position and receiving the returning light beam; an aberration correcting part selecting any one of a plurality of aberration correction amounts previously set according to the recording layer selected from the plurality of recording layers, and correcting the spherical aberration based the aberration correction amount obtained as the selection result; and a processing device carrying out at least information reproduction, from among information recording, information reproduction and information deletion, with the use of the output signal of the photodetector.

In this configuration, a light beam emitted from the light source is applied to the selected one of the plurality of recording layers of the optical disk through the objective lens by which the light beam is condensed on the selected recording layer so as to produce a beam spot thereon. The returning light beam reflected by the selected recording layer is then detected by the photodetector. Then, the processing device carries out at least information reproduction from among information recording, information reproduction and information deletion, with the use of the output signal of the photodetector. In this case, prior to actual access to the optical disk, such as information reproduction from among information recording, information reproduction and information deletion, the aberration correcting part selects the aberration correction amount according to the selected recording layer, and, based on the selected aberration correction amount, aberration correction is carried out. As a result, even when any recording layer is selected from among the plurality of recording layers, a beam spot superior in terms of shape quality is stably produced on the relevant recording layer. As a result, it becomes possible to carry out access to the optical disk having the plurality of recording layers and thus having a large recording capacity, stably with high accuracy.

In this case, according to an eleventh aspect of the present invention, the optical disk may include a first recording layer and a second recording layer; the aberration correcting part may select an aberration correction amount with which spherical aberration becomes approximately minimum at a position corresponding to ($\frac{1}{4}$)t from the first recording layer toward the second recording layer where t denotes a distance between the first recording layer and the second recording layer, when the selected recording layer is the first recording layer, while the aberration correcting part may select an aberration correction amount with which spherical aberration becomes approximately minimum at a position corresponding to ($\frac{3}{4}$)t from the first recording layer toward the second recording layer, when the selected recording layer is the second recording layer.

In this case, according to a twelfth aspect of the present invention, the objective lens may be set in such a manner that wavefront aberration may become approximately minimum at a position corresponding to ($\frac{1}{2}$)t from the first recording layer toward the second recording layer when the applied light beam is approximately parallel light.

According to a thirteenth aspect of the present invention, in the tenth aspect of the present invention, the aberration correcting part may select an aberration correction amount with which spherical aberration becomes approximately minimum at a position corresponding to ($\frac{1}{3}$)t from the first recording layer toward the second recording layer where t denotes a distance between the first recording layer and the second recording layer, when the selected recording layer is the first recording layer, while the aberration correcting part may select an aberration correction amount with which spherical aberration becomes approximately minimum at a position corresponding to ($\frac{2}{3}$)t from the first recording layer toward the second recording layer, when the selected recording layer is the second recording layer.

In this case, according to a fourteenth aspect of the present invention, the objective lens may be set in such a manner that wavefront aberration may become approximately minimum at a position corresponding to one of the first recording layer and the second recording layer when the applied light beam is approximately parallel light.

Further, according to a fifteenth aspect of the present invention, in any one of the above-mentioned tenth through fourteenth aspects of the present invention, the above-mentioned aberration correcting part may be configured to include a positive lens and a negative lens disposed on a light path lying between the light source and the objective lens, and may correct the spherical aberration as a result of a distance between the positive lens and the negative lens being adjusted according to the selection result.

Further, according to a sixteenth aspect of the present invention, in any one of the above-mentioned tenth through fourteenth aspects of the present invention, the aberration correcting part may be configured to include a coupling lens disposed on a light path lying between the light source and the objective lens, and may correct the spherical aberration as a result of a position of the coupling lens with respect to an optical axis direction being adjusted according to the selection result.

Further, according to a seventeenth aspect of the present invention, in any one of the above-mentioned tenth through fourteenth aspects of the present invention, the aberration correcting part may be configured to include an electrooptic device having a refractive index distribution varying according to an applied voltage, disposed on a light path lying between the light source and the objective lens, and may correct the spherical aberration as a result of the refractive index distribution being adjusted according to the selection result.

In this case, according to an eighteenth aspect of the present invention, the electrooptic device may be made of a liquid crystal device.

According to a nineteenth aspect of the present invention, in the seventeenth aspect of the present invention, the electrooptic device may be made of an optical device including an electrooptic crystal.

According to a twentieth aspect of the present invention, an optical disk on which at least information reproduction from among information recording, information reproduction and information deletion is carried out with the use of the optical disk apparatus according to any one of the above-described first through ninth aspects of the present invention, includes m recording layers, where m≧2, laminated together with a spacer inserted therebetween, and wherein the following formula holds:

$$t \leq 52 n^3 \lambda / \{(n^2-1)NA^4\}$$

where:

t denotes an inter-layer distance between the first recording layer and the m-th recording layer of the m recording layers;

n denotes an equivalent refractive index of the spacer;

λ denotes a wavelength of the light beam applied; and

NA denotes a numerical aperture of the objective lens of the optical disk apparatus.

In this configuration, when this optical disk is loaded in the optical disk apparatus according to any one of the first through ninth aspects of the present invention, even if the selected recording layer is any one of the m recording layers, the spherical aberration becomes less than a predetermined value. Since the requirements are such that the inter-layer distance should be not more than $52 n^3 \lambda / \{(n^2-1)NA^4\}$, which is not too strictly short in terms of the manufacturing technology, it is possible to improve the manufacturing yield of the optical disk. Accordingly, it is possible to reduce the cost of the optical disk.

According to a twenty-first aspect of the present invention, an optical disk on which at least information reproduction from among information recording, information reproduction and information deletion is carried out with the use of the optical disk apparatus according to the eleventh or twelfth aspect of the present invention, includes a first recording layer and a second recording layer, wherein the following formula holds:

$$t \leq 15 n^3 \lambda / \{(n^2-1)NA^4\}$$

where:

t denotes an inter-layer distance between the first recording layer and the second recording layer;

n denotes an equivalent refractive index between the first and second recording layer;

λ denotes a wavelength of the light beam applied; and

NA denotes a numerical aperture of the objective lens of the optical disk apparatus.

In this configuration, when this optical disk is loaded in the optical disk apparatus according to the eleventh or twelfth aspect of the present invention, the spherical aberration is controlled to be a low value for each recording layer by means of the aberration correcting part. Since the requirements are such that the inter-layer distance should be not more than 15 $n^3 \lambda / \{(n^2-1)NA^4\}$, the allowable range for the distance between the first and second recording layers is widened in comparison to the prior art. As a result, it is possible to improve the manufacturing yield of the optical disk. Accordingly, it is possible to reduce the cost of the optical disk.

According to a twenty-second aspect of the present invention, an optical disk on which at least information reproduction from among information recording, information reproduction and information deletion is carried out with the use of the optical disk apparatus according to the thirteenth or fourteenth aspect of the present invention, includes a first recording layer and a second recording layer, wherein the following formula holds:

$$t \leq 11 n^3 \lambda / \{(n^2-1)NA^4\}$$

where:

t denotes an inter-layer distance between the first recording layer and the second recording layer;

n denotes an equivalent refractive index between the first and second recording layers;

λ denotes a wavelength of the light beam applied; and

NA denotes a numerical aperture of the objective lens of the optical disk apparatus.

In this configuration, when this optical disk is loaded in the optical disk apparatus according to the thirteenth or fourteenth aspect of the present invention, the spherical aberration is controlled to be a low value for each recording layer by means of the aberration correcting part. Since the requirements are such that the inter-layer distance should be not more than 11 $n^3 \lambda / \{(n^2-1)NA^4\}$, the allowable range for the distance between the first and second recording layers is widened in comparison to the prior art. As a result, it is possible to improve the manufacturing yield of the optical disk. Accordingly, it is possible to reduce the cost of the optical disk.

Other objects and further features of the present invention will become more apparent from the following detailed description when read in conjunction with the accompanying drawings:

DETAILED DESCRIPTION OF THE PREFERRED EMBODIMENTS

Figure 1:
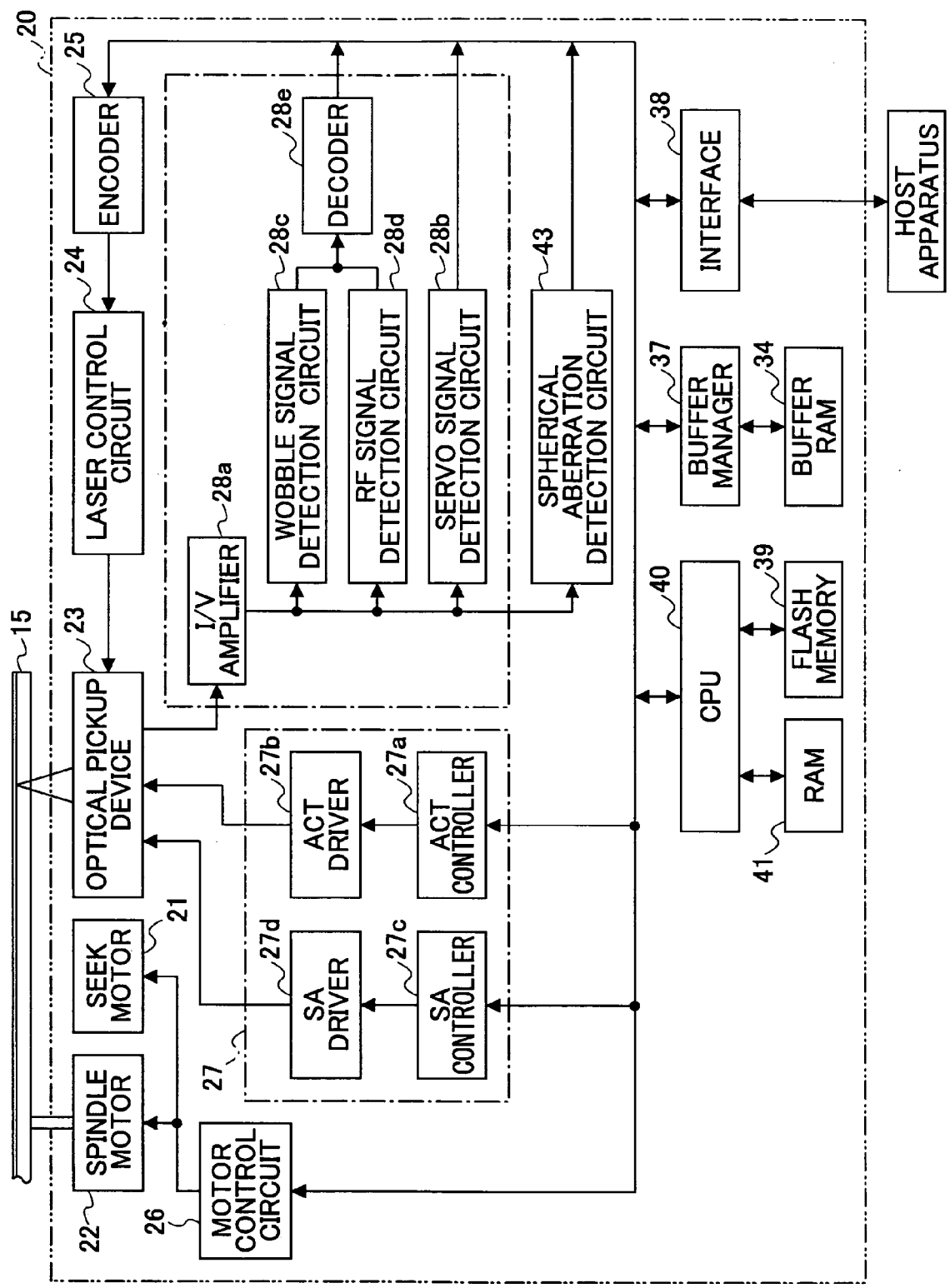
FIG. 1 shows a block diagram illustrating a configuration of an optical disk apparatus according to an embodiment of the present invention.

With reference to FIGS. 1 through 6, a first embodiment of the present invention is described. FIG. 1 shows a general configuration of an optical disk apparatus 20 according to the first embodiment of the present invention.

The optical disk apparatus 20 includes a spindle motor 22 driving and rotating an optical disk 15; an optical pickup device 23; a seek motor 21 driving the optical pickup device 23 in a sledge direction; a laser control circuit 24; an encoder 25; a motor control circuit 26; a servo control circuit 27; a reproduced signal processing circuit 28; a buffer RAM 34; a buffer manager 37; an interface 38; a flash memory 39; a CPU 40; a RAM 41; and a spherical aberration detection circuit 43 acting as an aberration detecting part. Arrows shown in FIG. 1 merely represent flows of typical signals or information, and do not necessarily represent all the connection relationships among the respective blocks.

Figure 2:
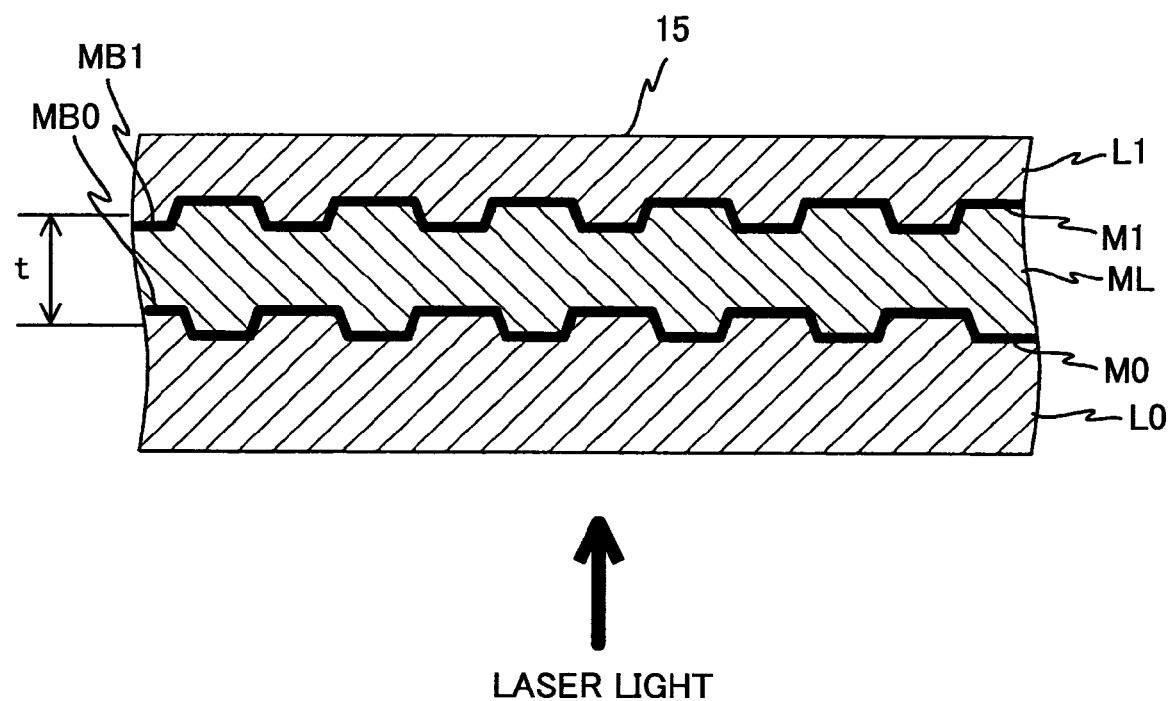
FIG. 2 shows a sectional view illustrating a configuration of an optical disk according to an embodiment of the present invention.

The optical disk 15 is configured to have a light beam of approximately 400 nm in wavelength applied thereto, has two recording layers, and is one according to an embodiment of the present invention. This optical disk 15 has, for example, as shown in FIG. 2, a first substrate L0; a first recording layer M0; an intermediate layer ML acting as a spacer; a second recording layer M1; and a second substrate L1, in an order starting from the light beam entrance side. Further, between the first recording layer M0 and the intermediate layer ML, a translucent film MB0 made of gold, dielectric or such is provided, and also, between the second recording layer M1 and the second substrate L1, a metal reflective film MB1 made of aluminum or such is provided. As the intermediate layer ML, ultraviolet curing type resin material having high transmittance with respect to the applied light beam and has a refractive index (equivalent refractive index=1.623) close to that of the substrate is applied. A thickness 't' of the intermediate layer ML, in other words, an inter-layer distance between the first recording layer M0 and the second recording layer M1 will be described later. Further, a spiral or concentric track is produced in each of these recording layers.

Figure 3A:
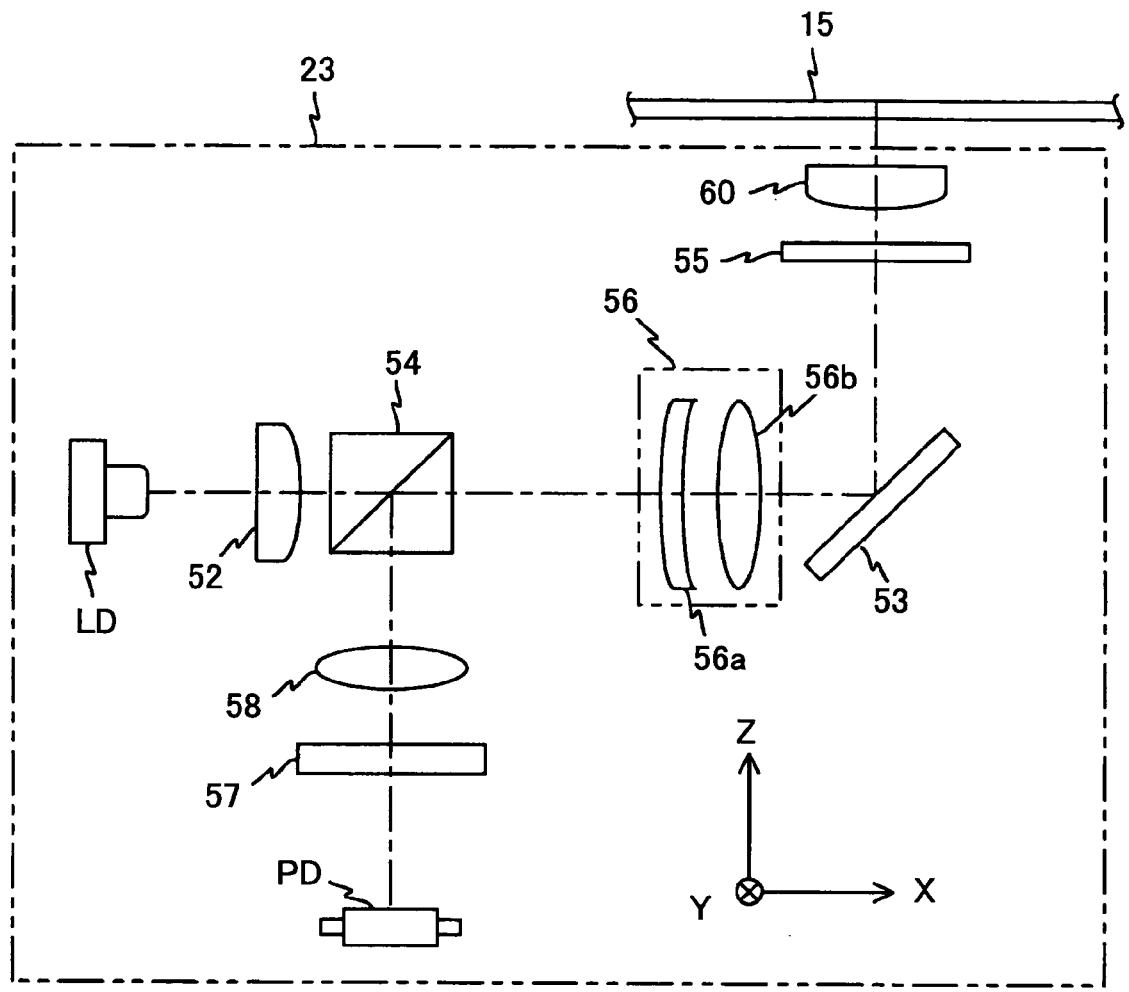
FIG. 3A illustrates a configuration of an optical pickup device shown in FIG. 1.

The optical pickup device 23 condenses laser light to a recording layer (simply referred to as a 'selected recording layer', hereinafter) selected from among the plurality of recording layers of the optical disk 15, and also, receives reflected light reflected by the selected recording layer. This optical pickup device 23 includes, for example, as shown in FIG. 3A, a light source LD, a coupling lens 52, a deflection prism 53, a polarization beam splitter 54, a ¼ wavelength plate 55, an aberration correction lens system 56, a hologram 57, a condensing lens 58, an objective lens 60, a light receiving device PD as a photodetector, and a driving system (a focusing actuator and a tracking actuator, not shown in the figure).

The light source LD is a semiconductor laser emitting a light beam in linear polarization (S polarization as an example) having a wavelength of approximately 400 nm. It is assumed that the maximum strength emitting direction of the light beam emitted by the light source LD is a +X direction. The coupling lens 52 is disposed on the +X side of the light source LD, and transforms the light beam emitted by the light source LD into approximately parallel light.

The polarization beam splitter 54 is disposed on the +X side of the coupling lens 52, has a high transmittance with respect to S polarized light, and has a high reflectance with respect to P polarized light. Accordingly, the polarization beam splitter 52 transmits the light beam from the coupling lens 52 as well as causing the returning light beam from the optical disk 15 to branch in a –Z direction.

The aberration correction lens system 56 is disposed on the +X side of the polarization beam splitter 54, and, includes a concave lens 56a as a negative lens, a convex lens 56b as a positive lens and a driving device (not shown) driving at least one of the concave lens 56a and the convex lens 56b so as to change a spacing between these lenses (which may be referred to as a 'lens spacing', hereinafter). When the lens spacing changes, image forming magnification of the objective lens 60 changes, and spherical aberration on the selected recording layer on the selected recording layer changes accordingly. Relationship between the image forming magnification and the spherical aberration is already obtained from experimentation, simulation or theoretical calculation.

The deflection prism 53 is deposed on the +X side of the aberration correction lens system 56, and bends the light beam coming from the aberration correction lens system 56 in a +Z direction. A reflective mirror may be provided instead of the deflection prism 53. On the +Z side of the deflection prism 53, the above-mentioned ¼ wavelength plate 55 is disposed, and the above-mentioned objective lens 60 is disposed on the +Z side of the ¼ wavelength plate 55. For example, a numerical aperture of the objective lens 60 is set as 0.65 in the present embodiment.

The above-mentioned condensing lens 58 is disposed on the –Z side of the polarization beam splitter 54, and condenses the returning light beam caused to branch by means of the polarization beam splitter 54.

Figure 3B:
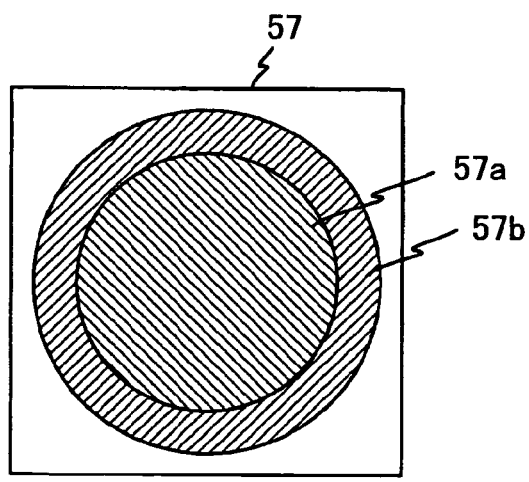
FIG. 3B illustrates a hologram shown in FIG. 3A.

The above-mentioned hologram 57 is disposed on the –Z side of the condensing lens 58, and, for example, as shown in FIG. 3B, has two diffraction areas 57*a* and 57*b* having mutually different diffraction directions. The diffraction area 57*a* is a circular area located at the center of the hologram 57 as shown. The diffraction area 57*b* is a ring-shaped area abutting in the periphery of the diffraction area 57*a*.

The above-mentioned light receiving part PD is disposed on the −Z side of the hologram 57, and includes a plurality of light receiving areas including a first light receiving area for receiving diffracted light from the above-mentioned diffraction area 57*a* and a second light receiving area for receiving diffracted light from the above-mentioned diffraction area 57*b*. The light receiving part PD outputs a signal (light-to-electricity converted signal) according to a light received amount for each of these light receiving areas.

The focusing actuator (not shown) has a function of slightly driving the objective lens 60 in a focusing direction corresponding to an optical axis direction of the objective lens 60. The tracking actuator (not shown) has a function of slightly driving the objective lens 60 in a tracking direction.

In the present embodiment, setting is made such that a position at which wavefront aberration becomes approximately zero (which may be referred to as 'aberration reference position', hereinafter) when approximately parallel light is applied to the objective lens 60 coincides with a central position between the first recording layer M0 and the second recording layer M1 with respect to the optical axis direction of the objective lens 60.

A function of the optical pickup device 23 configured as described above is generally described next.

The linearly polarized (S-polarized) light beam emitted from the light source LD is transformed into approximately parallel light by means of the coupling lens 52, and is applied to the polarization beam splitter 54. Since the polarization beam splitter 54 has high transmittance with respect to the S-polarized light beam, almost all of the applied light beam is transmitted thereby, and is applied to the deflection prism 53 via the aberration correction lens system 56. The light beam applied to the deflection prism 53 is bent in the +Z direction in its optical axis, and then, is condensed on the selected recording layer of the optical disk 15 as being a fine spot by means of the objective lens 60 after being transformed into circular polarization by means of the ¼ wavelength plate 55.

A reflected light beam (returning light beam) reflected by the selected recording layer of the optical disk 15 is in circular polarization with a turning direction reverse to that of the applied light beam, is then again transformed into approximately parallel light by means of the objective lens 60. Then, after being transformed from the circular polarization to linear polarization (P polarization) by means of the ¼ wavelength plate 55, the returning light beam is applied to the deflection prism 53. The light beam applied to the deflection prism 53 is bent in its optical axis in the −X direction, and is applied to the polarization beam splitter 54 via the aberration correction lens system 56. The polarization beam splitter 54 has high reflectance with respect to the P-polarized light beam, and as a result, the applied light beam (returning light beam) is caused to branch in the −Z direction. The returning light beam caused to branch in the −Z direction is then received by the light receiving device PD via the condensing lens 58 and the hologram 57.

Returning to FIG. 1, the reproduced signal processing circuit 28 includes an I/V amplifier 28*a*, a servo signal detection circuit 28*b*, a wobble signal detection circuit 28*c*, an RF signal detection circuit 28*d* and a decoder 28*e*.

The I/V amplifier 28*a* converts the output signal of the light receiving device PD into a voltage signal, and also, amplifies the same with a predetermined gain. The signal thus converted and amplified by means of the I/V amplifier 28*a* is output to the servo signal detection circuit 28*b*, the wobble signal detection circuit 28*c*, the RF signal detection circuit 28*d* and the spherical aberration detection circuit 43.

The servo signal detection circuit 28*b* detects a servo signal such as a focus error signal, a tracking error signal or such based on the output signal of the I/V amplifier 28*a*. The servo signal thus detected is output to the servo control circuit 27.

The wobble signal detection circuit 28*c* detects a wobble signal based on the output signal of the I/V amplifier 28*a*. The RF signal detecting circuit detects an RF signal based on the output signal of the I/V amplifier 28*c*. The decoder 28*e* extracts address information and a synchronization signal from the wobble signal. The thus-extracted address information is output to the CPU 40, and the synchronization signal is output to the encoder 25 and the motor control circuit 26. The decoder 28*e* carries out decoding processing and error detection processing on the RF signal. Then, when error is detected, the decoder carries out error correction processing, and then, thus obtained data is stored in the buffer RAM 34 via the buffer manager 37 as reproduced data.

The spherical aberration detection circuit 43 detects a physical amount relative to spherical aberration based on a differential signal between the output signal of the I/V amplifier 28*a* from the output signal from the first light receiving area of the light receiving device PD and the output signal of the I/V amplifier 28*a* from the output signal from the second light receiving area of the light receiving device PD. That is, when spherical aberration occurs due to the intermediate layer ML, a shape of the light spot produced on the selected recording layer degrades. Thereby, 'delay in wavefront' occurs concentrically about the optical axis of the detection lens 58 in the returning light beam with respect to a reference wavefront of the returning light beam. Accordingly, to the diffraction area 57*a*, a light beam having a smaller 'delay in wavefront' is applied, while, to the diffraction area 57*b*, a light beam having a large 'delay in wavefront' is applied. As a result, it is possible to know the defocus condition in the returning light beam from a difference between the light receiving amount in the first light receiving area and the light receiving amount in the second light receiving area. Thereby, it is possible to detect the physical amount relative to the spherical aberration. The physical amount relative to the spherical aberration thus detected is output to the servo control circuit 27.

The servo control circuit 27 includes an ACT controller 27*a*, an ACT driver 27*b*, an SA controller 27*c*, and an SA driver 27*d*.

The ACT controller 27*a* generates a focus control signal for correcting a focus error based on the focus error signal, and also, generates a tracking control signal for correcting a tracking error based on the tracking error signal. The focus control signal and tracking control signal thus generated are output to the ACT driver 27*b*.

The ACT driver 27*b* outputs a focusing actuator driving signal based on the focus control signal, and also, outputs a tracking actuator driving signal based on the tracking control signal, to the optical pickup device 23. Thus, tracking control and focus control are carried out. The tracking control and the focus control are initiated by a servo on request from the CPU 40, and is terminated by a servo off request.

The SA controller 27*c* refers to given relationship between the image forming magnification and the physical amount relative to the spherical aberration, on the other hand obtains an image forming magnification (which may be referred to as 'optimum image forming magnification', hereinafter) at which the spherical aberration becomes approximately minimum, based on the output signal of the spherical aberration detection circuit 43, then generates a signal for controlling the lens spacing in the aberration correction lens system 56 such that the image forming magnification of the objective lens 60 may become the optimum image forming magnification, and thus, output the thus-generated signal as an aberration correction signal to the SA driver 27*d*. The SA controller 27*c* includes a memory (not shown), and, when power is turned on in the optical disk apparatus 20, the above-mentioned given relationship between the image forming magnification and the spherical aberration is transferred thereto from the flash memory 39 to be available therefrom to be referred to as mentioned above.

The SA driver 27*d* then outputs a driving signal for the lens driving device not shown included in the aberration correction lens system 56 according to the aberration correction signal from the SA controller 27*c*, to the optical pickup device 23. Thus, the image forming magnification of the objective lens 60 becomes the optimum image forming magnification, and thus, the spherical aberration is corrected.

Figure 4:
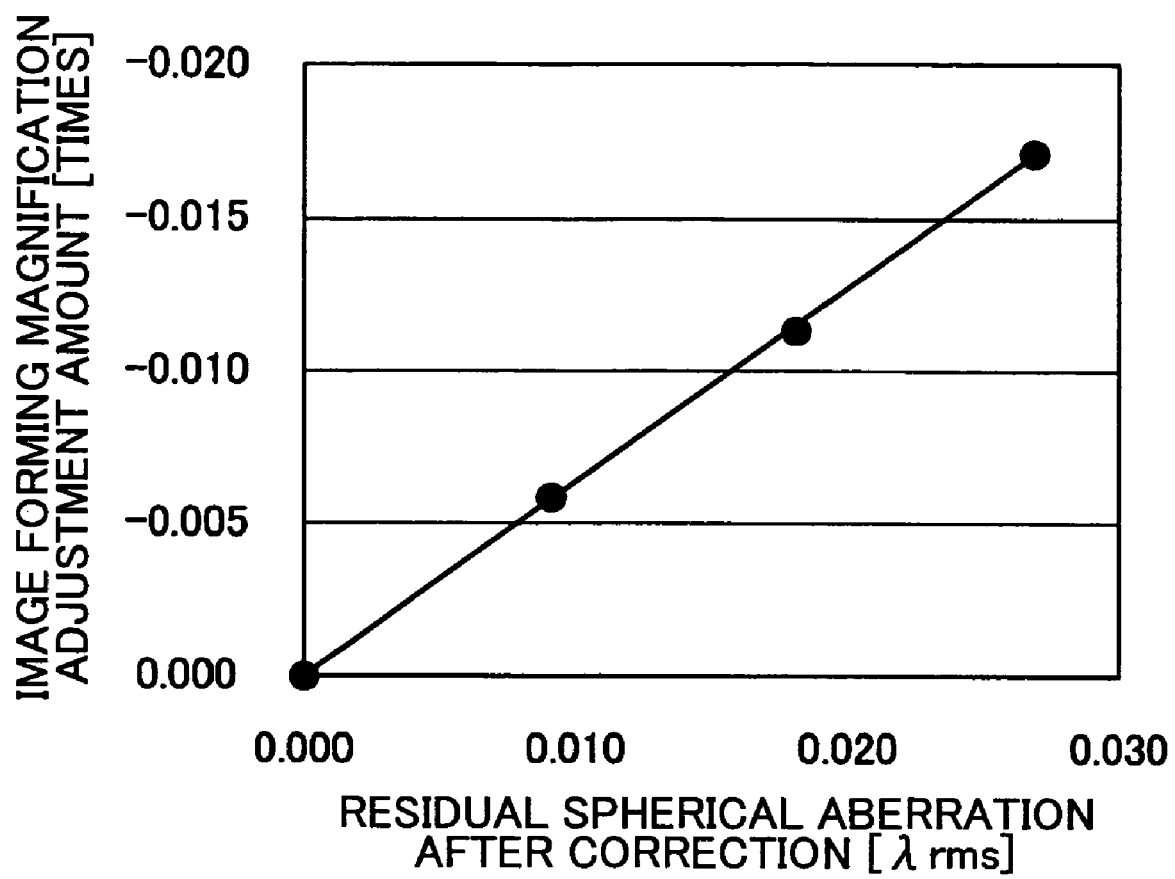
FIG. 4 illustrates relationship between an adjustment amount of image forming magnification of an objective lens and a residual spherical aberration after correction.
Figure 5A:
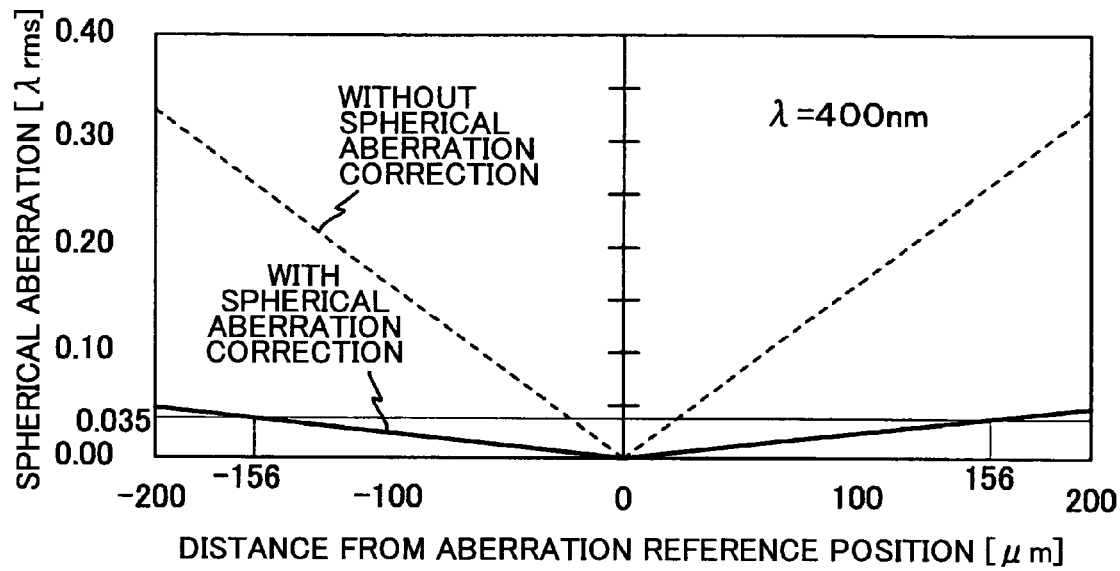
FIGS. 5A and 5B illustrate relationship between a distance from an aberration reference position and spherical aberration for each of a case of wavelength of 400 nm and a case of wavelength of 660 nm.
Figure 5B:
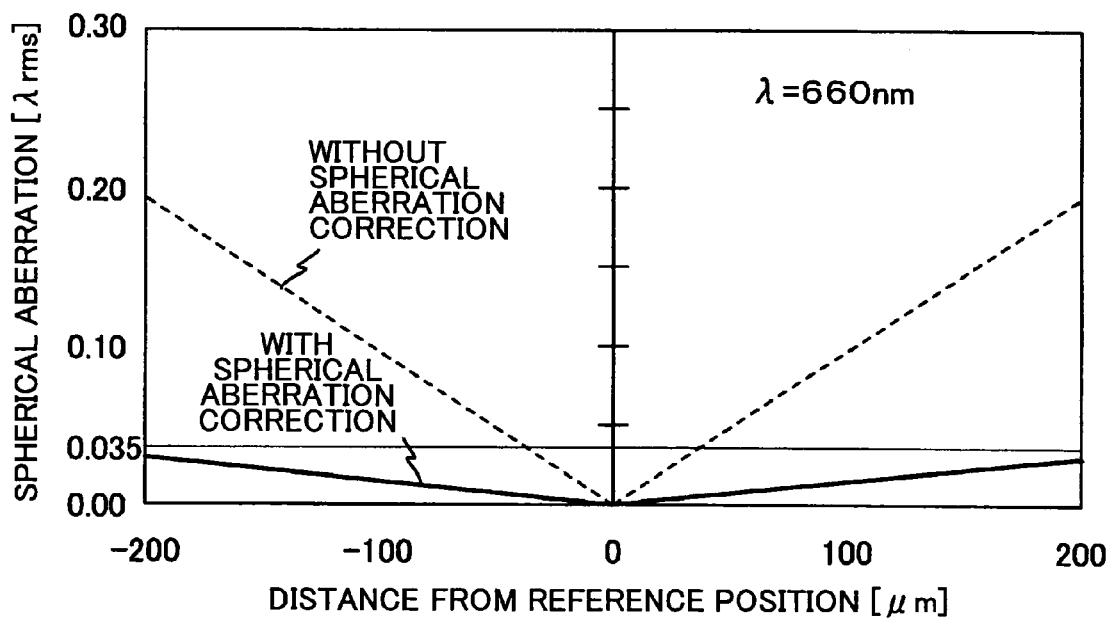

As one example, as shown in FIG. 4, spherical aberration still remains even after the spherical aberration is corrected as described above, and a magnitude thereof is approximately in proportion to the image forming magnification adjustment amount. However, as shown in FIG. 5A as one example, the magnitude of the spherical aberration is reduced approximately in a rate of 1/7 through the correction. In FIG. 5A, a side toward the objective lens 60 with respect to the above-mentioned aberration reference position is set as a minus side. Further, FIG. 5B shows, for the purpose of comparison, spherical aberration when a wavelength of the laser light is approximately 660 nm.

It is well-known that spherical aberration without being corrected is expressed by the following formula (1), where $W_{40}^{rms}$ denotes spherical aberration expressed in an RMS value; d denotes a distance from the above-mentioned aberration reference position; n denotes an equivalent refractive index of the intermediate layer ML; and NA denotes a numerical aperture of the objective lens 60:

$$W_{40}^{rms} \approx \{1/48\sqrt{5}\}\{(n^2-1)/n^3\}NA^4 \cdot d \quad (1)$$

As described above, since the spherical aberration becomes approximately 1/7, through correction, of that before the correction, it can be seen that the spherical aberration $W_{40}^{rms}$ obtained after the correction is expressed by the following formula (2):

$$W_{40}^{rms} \approx (1/7)\{1/48\sqrt{5}\}\{(n^2-1)/n^3\}NA^4 \cdot d \quad (2)$$

Since the above-mentioned aberration reference position is set as being a position corresponding to approximately the center in the above-mentioned intermediate layer ML with respect to the optical axis of the objective lens 60, each of spherical aberration on the first recording layer M0 and spherical aberration on the second recording layer M1 is expressed by the following formula (4), where t denotes the thickness of the intermediate layer ML:

$$W_{40}^{rms} \approx (1/7)\{1/48\sqrt{5}\}\{(n^2-1)/n^3\}NA^4(t/2) \quad (3)$$

Further, generally speaking, in order to stably reproduce information recorded in an optical disk, wavefront aberration should be reduced as being less than $0.07\lambda$ (so-called Marechal's criterion) in an RMS value where $\lambda$ denotes a wavelength of a light beam, according to an empirical rule. Since it is necessary to consider wavefront aberration as including aberration of an objective lens, aberration caused due to possible inclination of an optical disk or such, it is necessary to set an allowable limit of wavefront aberration as being not more than 1/2 of $0.07\lambda$ (=$0.035\lambda$) Therefore, as requirements for obtaining each spherical aberration in the first recording layer M0 and the second recording layer M1 as being not more than $0.035\lambda$, the following formula (4) can be obtained based on the above-mentioned formula (3):

$$t \leq 52n^3\lambda/\{(n^2-1)NA^4\} \quad (4)$$

As $\lambda=0.40$ [μm]; n=1.623; NA=0.65 are substituted in the above-mentioned formula (4), $t \leq 312$ [μm] is obtained. That is, an upper limit of the spacing (=thickness of the intermediate layer ML) between the recording layers in the optical disk 15 is approximately three times the upper limit (70 μm) in the above-described one-side two-layer DVD-ROM. Accordingly, it is possible to utilize a conventional manufacturing apparatus, and thus, it is possible to manufacture the optical disk 15 at a reduced cost.

Further, a lower limit of the thickness t of the intermediate layer ML may be determined based on at least one of a capture range of the focus error signal and an output level of the light receiving device PD obtained when influence of inter-layer crosstalk is small. For example, as shown in FIG. 3 of 'PIONEER R&D Vol. 6, No. 2 (1996) by Yuki Kuribayasi et al., pages 62-72', if $t \geq 45$ μm, influence of inter-layer crosstalk may cause remarkable increase in jitter deterioration in the output signal of the light receiving device PD. Further, assuming that control error of the above-mentioned aberration correction lens system 56 as being approximately 5%, it is preferable that $t \geq 45$ μm. As a result, the preferable range of the thickness t of the intermediate layer ML is such that 45 [μm] $\leq t \leq 312$ [μm]

Returning to FIG. 1, the motor control circuit 26 controls the spindle motor 22 and the seek motor 21 according to instructions given by the CPU 40.

In the buffer RAM 34, data (recording data) to be recorded in the optical disk 15, data (reproduced data) reproduced from the optical disk 15 or such is temporarily stored. Input or output of data in/from the buffer RAM 34 is managed by the buffer manager 37.

The encoder 25 takes the recording data stored in the buffer RAM 34 via the buffer manager 37 based on the instructions from the CPU 40, carries out data modulation, addition of error correction code or such, and generates a signal (writing signal) to be written in the optical disk 15. The thus-generated writing signal is output to the laser control circuit 24.

The laser control circuit 24 controls power of laser light emitted from the light source LD. For example, upon recording, a driving signal for the light source LD is generated by the laser control circuit 24 based on the above-mentioned writing signal, recording requirements, light emitting characteristics of the light source LD or such.

The interface 38 is a bi-directional interface with the host apparatus (for example, a personal computer), and conforms to standard interfaces such as ATAPI (AT Attachment Packet Interface), SCSI (Small Computer System Interface), USB (Universal Serial Bus) or such.

In the flash memory 39, programs described in a code interpretable by the CPU 40, the above-mentioned relationship between the image forming magnification and the physical amount relative to the spherical aberration, the recording requirements, the light emitting characteristics in the light source LD and so forth are stored.

The CPU 40 controls operations of the respective parts/devices according to the programs stored in the flash memory 39, and also, writes data, necessary for the control operations or such, in the RAM 41.

Figure 6:
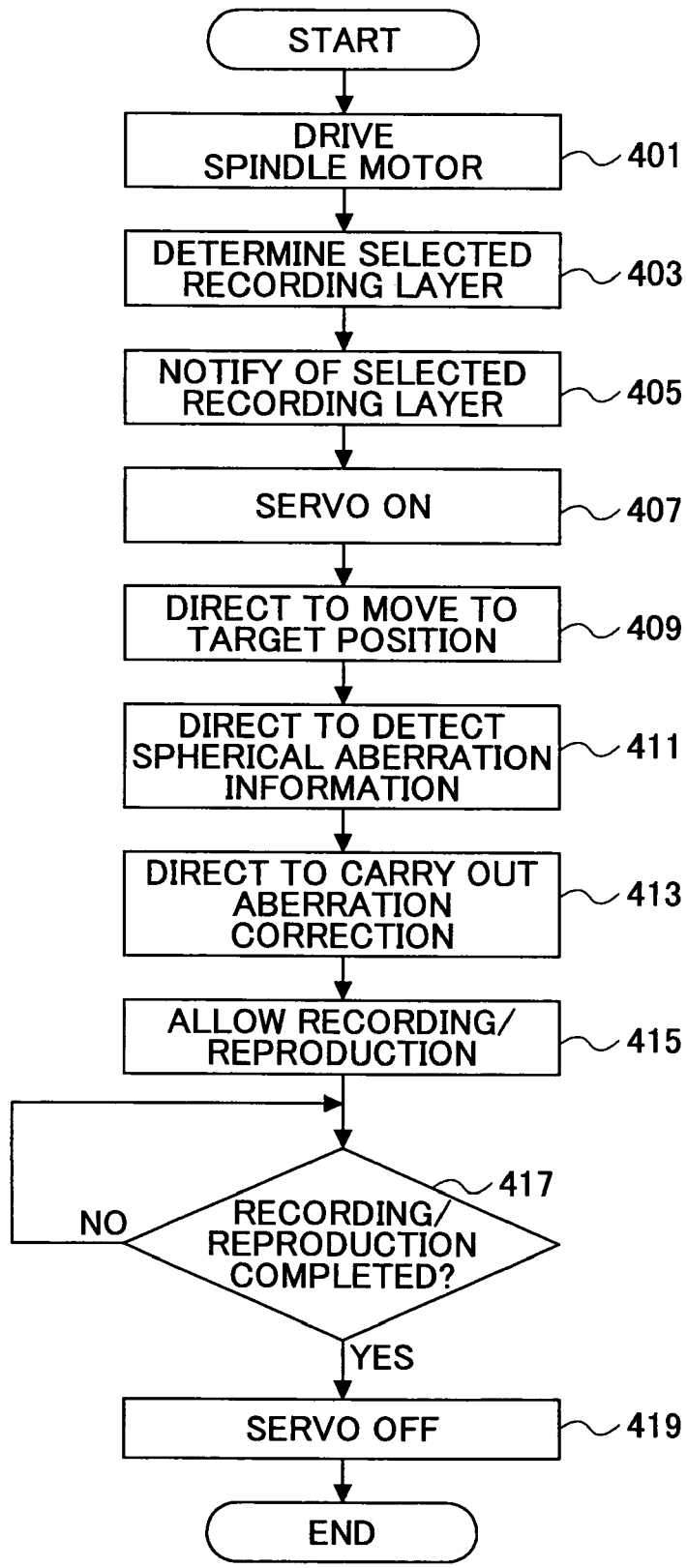
FIG. 6 shows a flow chart illustrating processing operation carried out when the optical disk apparatus shown in FIG. 1 receives a recording request command or a reproduction request command from a host apparatus.

With reference to FIG. 6, processing carried out by the optical disk apparatus 20 when an access request is given by the host apparatus is briefly described next. A flow chart shown in FIG. 6 corresponds to a series of algorithm carried out by the CPU 40.

When a recording request command or a reproduction request command (generally referred to as a 'request command', hereinafter) is received from the host apparatus, a top address of a program corresponding to the flow chart shown in FIG. 6 is set in a program counter of the CPU 40, and thus, the processing is started.

In Step 401, first, instructions are given to the motor control circuit 26 such that the optical disk 15 may rotate at a predetermined line velocity (or angular velocity), and also, the fact that the request command has been received from the host apparatus is notified of to the reproduction signal processing circuit 28.

In Step 403, a designation address is extracted from the request command, and, from the designation address, it is determined whether the selected recording layer is the first recording layer M0 or the second recording layer M1.

In Step S405, information concerning the thus determined selected recording layer is notified of to the servo control circuit 27 or such.

In Step S407, upon checking that the optical disk 15 rotates in the predetermined line velocity (or angular velocity), instructions for 'servo on' are given to the servo control circuit 27. Thereby, as described above, tracking control and focus control are carried out. Tracking control and focus control are carried out at any time if necessary until the current information recording/reproduction processing is finished.

In Step S409, instructions are given to the motor control circuit 26 such that a light spot is produced around a target position according to the designated address. Thereby, seek operation is carried out. When the seek operation is not necessary, this process is skipped.

In Step S411, instructions are given to the spherical aberration detection circuit 43 such that the physical amount relative to the spherical aberration may be detected thereby.

In Step S413, instructions for correcting aberration are given to the servo control circuit 27. Thereby, the image forming magnification of the objective lens 60 becomes the optimum image forming magnification as described above, and thus, the spherical aberration is corrected. In other words, a shape quality of the light spot produced on the selected recording layer is improved. The aberration correction processing is carried out at any time if necessary until the current information recording/reproduction processing is finished.

In Step S415, actual information recording or reproduction is allowed according to the request command.

In Step S416, it is determined whether or not the recording or reproduction has been completed. When it has not been completed, the same determination is carried out again after a predetermined time interval has elapsed. When the recording or reproduction has been completed, Step S419 is carried out.

In Step S419, instructions for 'servo off' are given to the servo control circuit 27, and the current recording/reproduction is finished.

As can be clearly seen from the above description, the SA controller 27c, the SA driver 27d and the aberration correction lens system 56 act as an aberration correcting part. Further, the reproduced signal processing circuit 28, the CPU 40 and the programs carried out by the CPU 40 act as a processing device. All of or at least a part of the processing carried out by the CPU 40 according to the programs may be embodied by means of hardware instead.

As described above, in the optical disk apparatus 20 according to the first embodiment of the present invention, prior to actual access, such as recording or reproduction, to the optical disk 15 having the two recording layers, the spherical aberration detection circuit 43 detects the physical amount relative to the spherical aberration. Then, based on the detection result, the spacing between the concave lens 56a (negative lens) and the convex lens 56b (positive lens) included in the aberration correction lens system 56 is adjusted, and thereby, the image forming magnification of the objective lens 60 is changed. Thereby, even when the selected recording layer is any one of the recording layers, the spherical aberration becomes not more than 0.035λ, and the light spot having superior shape quality is produced on the selected recording layer accordingly. Accordingly, as a result, it is possible to carry out access to the large-recording-capacity optical disk having the plurality of recording layers, stably with high accuracy.

Further, in the optical disk 15 according to the embodiment of the present invention, when it is loaded in the optical disk apparatus 20, it is possible to control the spherical aberration to not more than 0.035λ whether the selected recording layer is the first recording layer M0 or the second recording layer M1. Further, since the spacing between the first recording layer M0 and the second recording layer M1 should be set as being not more than 312 μm, which is a not too strict value, an allowable range of the spacing between the first recording layer M0 and the second recording layer M1 thus increases from that in the conventional case, and it is possible to manufacture a product of the optical disk 15 at high yield with the use of a conventional manufacturing apparatus. Accordingly, it is possible to provide an optical disk having a large recording capacity at a reduced cost.

Generally speaking, a recording capacity of an optical disk is in proportion to the number of recording layers and second power of a numerical aperture of an objective lens, and also, is in reverse proportion to second power of a wavelength of laser light, as known. Accordingly, in comparison to a currently commercially available single-layer DVD (a recording capacity of 4.7 GB; a numerical aperture of 0.65; and a wavelength of 0.66 μm), an available recording capacity (referred to as M) of an optical disk according to the embodiment of the present invention is estimated by the following formula (5), where L denotes the number of recording layers; NA denotes a numerical aperture of an objective lens; and λ denotes a wavelength of laser light:

$$M=L\times\{(0.66/\lambda)/(0.65/NA)\}^2\times 4.7 \qquad (5)$$

Then, the respective values of the present embodiment, i.e., L=2; NA=0.65; and λ≈0.40, are substituted in the formula (5). As a result, M≈25.6 [GB] is obtained. This value is approximately 5.4 times that of the currently commercially available single DVD, and, approximately two hours of a TV program may be recorded therein accordingly.

In the above-described embodiment, the physical amount relative to the spherical aberration is detected based on the returning light beam divided by the hologram 57. However, it is not necessary to limit to this way, and, instead, the physical amount relative to the spherical aberration may be detected based on a magnitude of at least one of the RF signal and the tracking error signal. In this case, the spherical aberration detection circuit 43 obtains the magnitude of the RF signal, for example, and detects the physical amount relative to the spherical aberration from a difference between the thus-obtained magnitude of the RF signal and a previously obtained maximum value of this magnitude.

Further, in the above-described embodiment, the optical disk 15 has the two recording layers. However, other than that, the optical disk 15 may have three or more recording layers. That is, when an optical disk has m layers (m≧2), as long as an inter-layer distance between the first recording layer and the m-th recording layer satisfies the above-mentioned formula (4), the spherical aberration can be controlled to not more than $0.035\lambda$ regardless of which one of the recording layers becomes the selected recording layer. In this case, it is preferable that a central position between the first recording layer and the m-th recording layer is determined as the above-mentioned aberration reference position.

Further, in the above-described embodiment, the aberration correction lens system 56 is applied to correct the aberration. However, other than this way, the position of the collimator lens 52 may be shifted in the X-axis direction for the purpose of correcting the aberration, instead, for example. In this case, a driving mechanism is newly needed to move the collimator lens 52. However, instead, the aberration correction lens system 56 becomes not necessary. Further, in this case, the SA driver 27d should output a driving signal for the newly provided driving mechanism.

Furthermore, in the above-described embodiment, the concave lens 56a is disposed on the light source side of the convex lens 56b. However, other than this way, rather the convex lens 56b may be disposed on the light source side of the concave lens 56a. That is, what is essential is the lens spacing.

Furthermore, in the above-described embodiment, instead of the aberration correction lens system 56, an electrooptic device such as a liquid crystal device having a refractive index controllable by means of an applied voltage, an optical device including an electrooptic crystal, or such, may be applied. In this case, the SA driver 27d should output a voltage applied to the electrooptic device.

Further, in the above described embodiment, the numerical aperture of the objective lens 60 is 0.65. However, the objective lens 60 may have another numerical aperture.

Further, in the above-described embodiment, when luminous energy of the returning light flux is sufficiently large, a beam splitter having no polarization function may be applied instead of the polarization beam splitter 54. In this case, the ¼ wavelength plate 55 is not needed accordingly.

In the above-described embodiment, the optical disk apparatus has the single semiconductor laser. However, other than this way, the optical disk apparatus may have a plurality of semiconductor lasers emitting light beams of mutually different wavelengths. That is, the optical disk apparatus may be an optical disk apparatus which can handle a plurality of types of optical disks conforming to different standards, respectively. In this case, at least one of these plurality of types of optical disks should be a multi-layer disk.

Furthermore, in the above-described embodiment, the optical disk 15 is configured to have light of a wavelength of approximately 400 nm applied thereto. However, the present invention is not limited to this case. As described above, since the upper limit of the spacing between recording layers varies according to the wavelength of light applied, it is preferable that the upper limit of the wavelength of light to be applied which the optical disk is configured to have should be not less than the upper limit (70 µm) of the one-side two-layer DVD-ROM, in terms of productivity.

Figure 7:
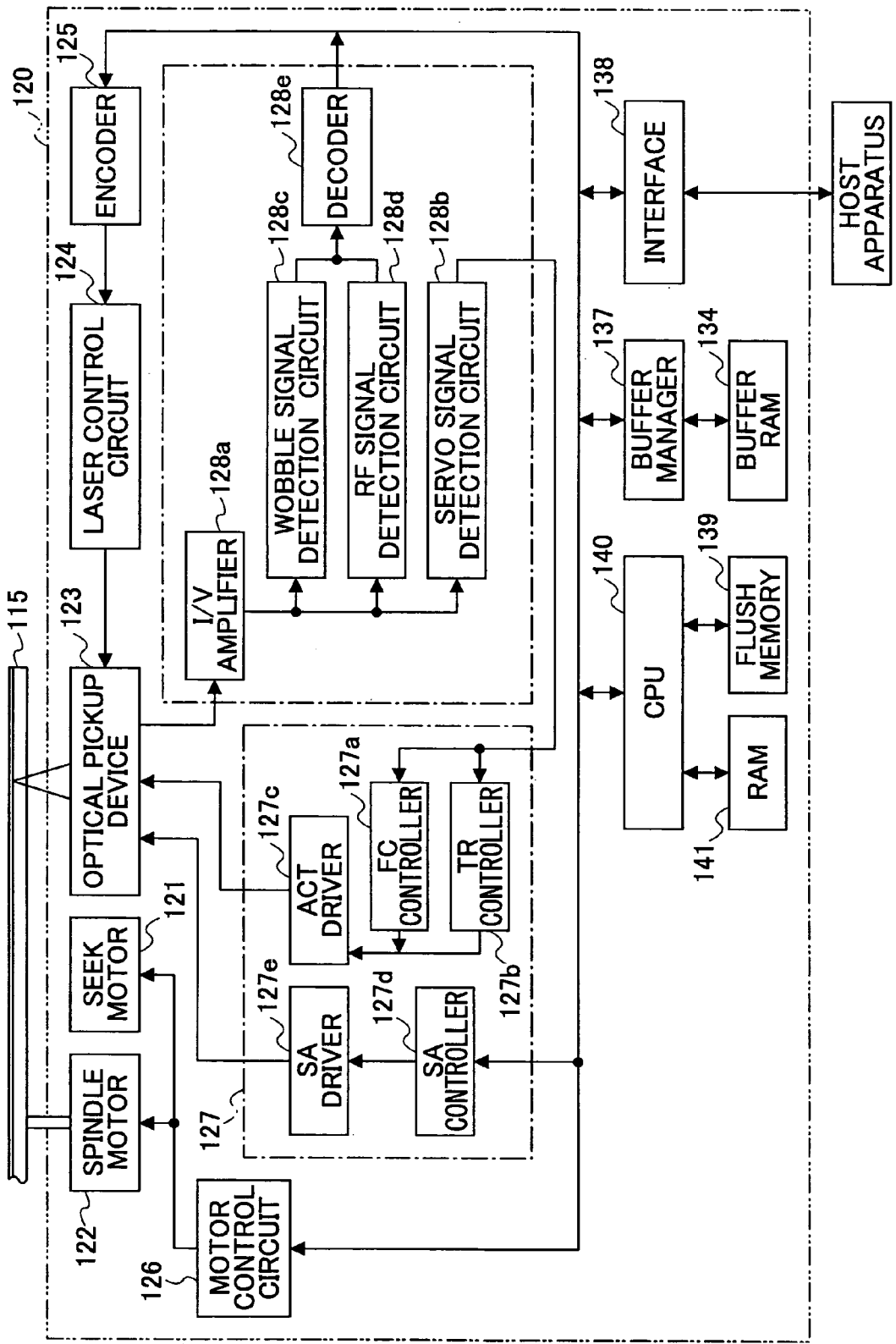
FIG. 7 shows a block diagram illustrating a configuration of an optical disk apparatus according to another embodiment of the present invention.

With reference to FIGS. 7 through 10B, a second embodiment of the present invention is described. FIG. 7 shows a general configuration of an optical disk apparatus 120 according to the second embodiment of the present invention.

The optical disk apparatus 120 includes a spindle motor 122 driving and rotating an optical disk 115; an optical pickup device 123; a seek motor 121 driving the optical pickup device 123 in a sledge direction; a laser control circuit 124; an encoder 125; a motor control circuit 126; a servo control circuit 127; a reproduced signal processing circuit 128; a buffer RAM 134; a buffer manager 137; an interface 138; a flash memory 139; a CPU 140; and a RAM 141. Arrows shown in FIG. 7 merely represent flows of typical signals or information, and do not necessarily represent all the connection relationships among the respective blocks. Further, the optical disk apparatus 120 is configured to handle an optical disk having a plurality of recording layers.

Figure 8A:
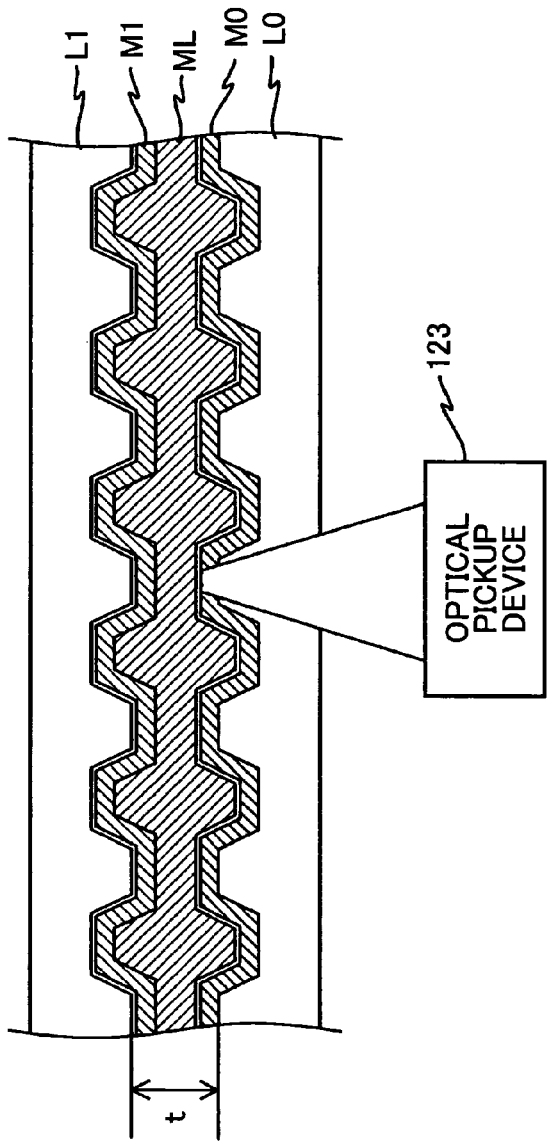
FIGS. 8A and 8B show sectional views illustrating a configuration of a one-side two-layer blue DVD which is an optical disk according to another embodiment of the present invention.
Figure 8B:
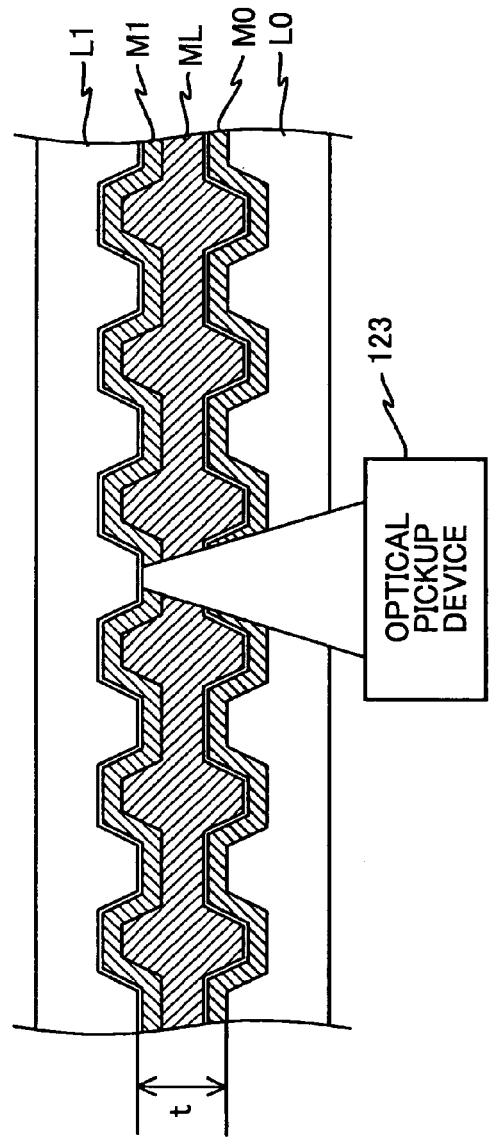

The optical disk 115 is configured to have a light beam of approximately 400 nm in wavelength applied thereto, has two recording layers, and is an optical disk (which may be referred to as a 'one-side two-layer blue DVD', hereinafter) according to an embodiment of the present invention. This optical disk 115 has, for example, as shown in FIGS. 8A and 8B, a first substrate L0; a first recording layer M0; an intermediate layer ML acting as a spacer; a second recording layer M1; and a second substrate L1, in an order starting from the side of the optical pickup device 123. Further, between the first recording layer M0 and the intermediate layer ML, a translucent film made of gold, dielectric or such is provided, and also, between the second recording layer M1 and the second substrate L1, a metal reflective film made of aluminum or such is provided. As the intermediate layer ML, ultraviolet curing type resin material having high transmittance with respect to a light beam applied by the optical pickup 123 and has a refractive index close to that of the substrate is employed. A thickness 't' of the intermediate layer ML, in other words, an inter-layer distance between the first recording layer M0 and the second recording layer M1 will be described later. Further, a spiral or concentric track is produced in each of the recording layers.

Figure 9:
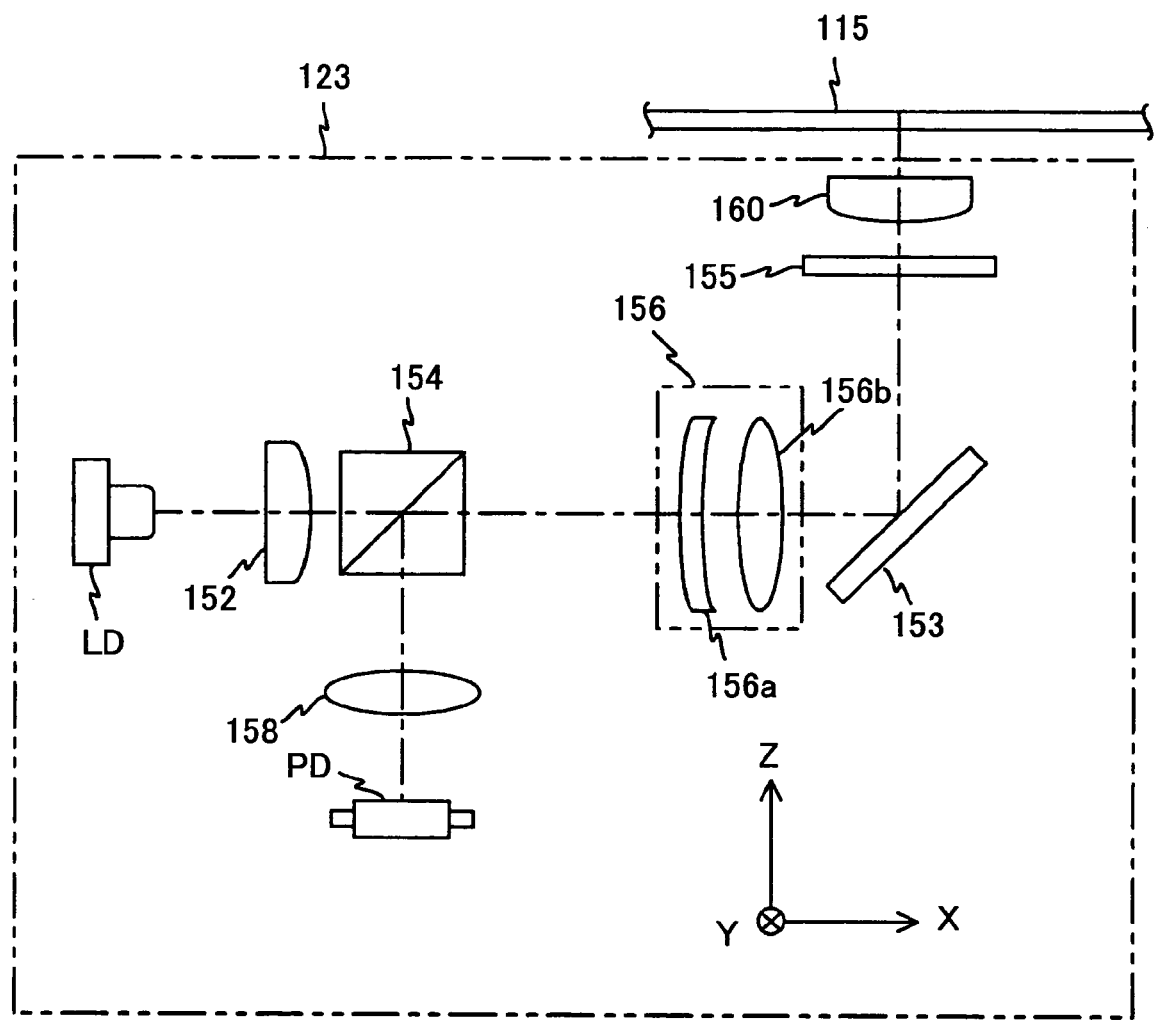
FIG. 9 illustrates a configuration of an optical pickup device shown in FIG. 7.

The optical pickup device 123 condenses laser light to a recording layer (simply referred to as a 'selected recording layer', hereinafter) selected from among the plurality of recording layers (M0 and M1) of the optical disk 115, and also, receives reflected light from the selected recording layer. This optical pickup device 123 includes, for example, as shown in FIG. 9, a light source LD, a coupling lens 152, a deflection prism 153, a polarization beam splitter 154, a ¼ wavelength plate 155, an aberration correction lens system 156, a condensing lens 158, an objective lens 160, a light receiving device PD as a photodetector, and a driving system (a focusing actuator and a tracking actuator, not shown in the figure).

The light source LD is a semiconductor laser emitting a light beam in linear polarization (S polarization as an example) having the wavelength of approximately 400 nm. A setting is made such that the maximum strength emitting direction of the light beam emitted by the light source LD corresponds to a +X direction. The coupling lens 152 is disposed on the +X side of the light source LD, and transforms the light beam emitted by the light source LD into approximately parallel light.

The polarization beam splitter 154 is disposed on the +X side of the coupling lens 152, has a high transmittance with respect to S polarized light, and has a high reflectance with respect to P polarized light. Accordingly, the polarization beam splitter 152 transmits the light beam from the coupling lens 152 as well as causing the returning light beam from the optical disk 115 to branch in a −Z direction.

The aberration correction lens system 156 is disposed on the +X side of the polarization beam splitter 154, and, includes a concave lens 156a as a negative lens, a convex lens 156b as a positive lens and a driving device (not shown) driving at least one of the concave lens 156a and the convex lens 156b so as to change a spacing between these lenses (which may be referred to as 'lens spacing', hereinafter).

When the lens spacing changes, an image forming magnification of the objective lens 160 changes, and spherical aberration on the selected recording layer changes accordingly.

The deflection prism 153 is deposed on the +X side of the aberration correction lens system 156, and bends the light beam coming from the aberration correction lens system 156 in a +Z direction. A reflective mirror may be applied instead of the deflection prism 53. On the +Z side of the deflection prism 153, the above-mentioned ¼ wavelength plate 155 is disposed, and the above-mentioned objective lens 160 is disposed on the +Z side of the ¼ wavelength plate 155.

The above-mentioned condensing lens 158 is disposed on the −Z side of the polarization beam splitter 154, and condenses the returning light beam caused to branch by means of the polarization beam splitter 154 on a light receiving surface of the light receiving device PD.

The focusing actuator (not shown) has a function of slightly driving the objective lens 160 in a focusing direction corresponding to an optical axis direction of the objective lens 160. The tracking actuator (not shown) has a function of slightly driving the objective lens 160 in a tracking direction perpendicular to a tangential direction of the track.

In the present embodiment, setting is made such that a position at which wavefront aberration becomes approximately zero (which may be referred to as 'aberration reference position', hereinafter) when approximately parallel light is applied to the objective lens 160 coincides with an approximately central position in the intermediate layer ML with respect to the optical axis direction of the objective lens 160.

Returning to FIG. 7, the reproduced signal processing circuit 128 includes an I/V amplifier 128a, a servo signal detection circuit 128b, a wobble signal detection circuit 128c, an RF signal detection circuit 128d and a decoder 128e.

The I/V amplifier 128a converts an output signal of the light receiving device PD into a voltage signal, and also, amplifies with a predetermined gain.

The servo signal detection circuit 128b detects a servo signal such as a focus error signal, a tracking error signal or such, based on the output signal of the I/V amplifier 128a. The servo signal thus detected is then output to the servo control circuit 127.

The wobble signal detection circuit 128c detects a wobble signal based on the output signal of the I/V amplifier 128a. The RF signal detecting circuit 128d detects an RF signal based on the output signal of the I/V amplifier 128c. The decoder 128e extracts address information and a synchronization signal from the wobble signal. The thus-extracted address information is output to the CPU 140, and the synchronization signal is output to the encoder 125. The decoder 128e carries out decoding processing and error detection processing on the RF signal. Then, when error is detected, the decoder 128e carries out error correction processing, and then, thus obtained data is stored in the buffer RAM 134 via the buffer manager 137 as reproduced data.

The servo control circuit 127 includes an FC controller 127a, a TR controller 127b, an ACT driver 127c, an SA controller 126d, and an SA driver 127e.

The FC controller 127a generates a focus control signal for correcting a focus error based on the focus error signal. The TR controller 127b generates a tracking control signal for correcting a tracking error based on the tracking error signal. The focus control signal and tracking control signal thus generated are output to the ACT driver 127c.

The ACT driver 126c outputs a focusing actuator driving signal (driving current) according to the focus control signal, and also, outputs a tracking actuator driving signal (driving current) according to the tracking control signal, to the optical pickup device 123. Thus, tracking control and focus control are carried out.

The SA controller 127d generates a lens spacing control signal for controlling a spacing between both the lenses included in the aberration correction lens system 156, based on information concerning the selected recording layer from the CPU 40. The thus-generated lens spacing control signal is output to the SA driver 127e.

The SA driver 127d outputs one of previously set two driving signals (a driving signal A and a driving signal B) as a driving signal for driving the lens driving device included in the aberration correction lens system 156 to the optical pickup device 123 according to the above-mentioned lens spacing control signal. According to the present embodiment, the driving signal A is output when the selected recording layer is the first recording layer while the driving signal B is output when the selected recording layer is the second recording layer.

Figure 10A:
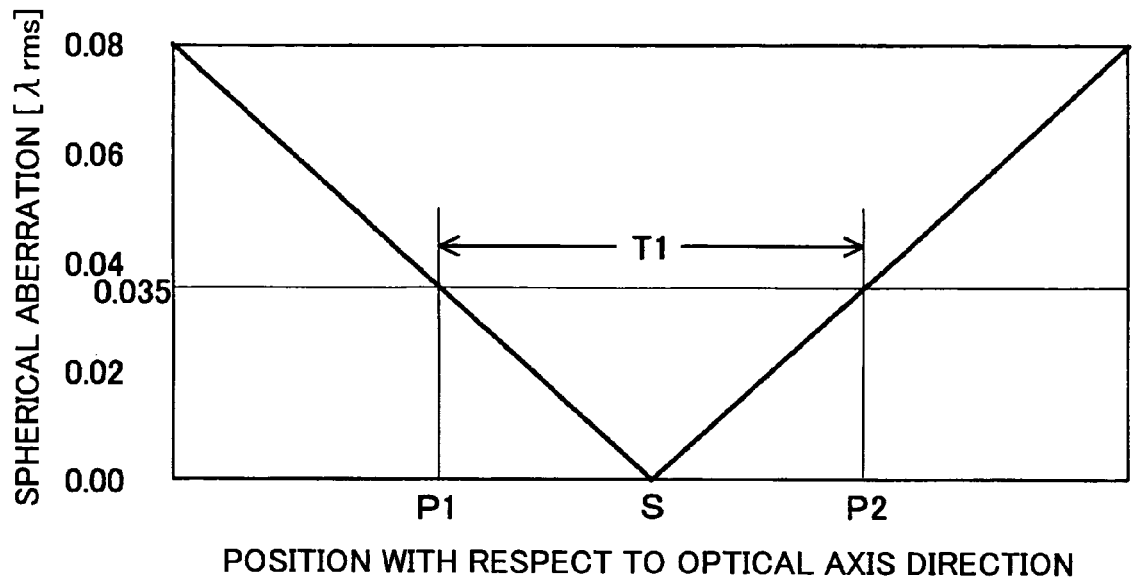
FIGS. 10A and 10B each of which illustrates a relationship between two types of driving signals and spherical aberration in a case where an aberration reference position is set at a position corresponding to approximately a center of an intermediate layer.

It is well-known that spherical aberration without being corrected increases in proportion to a distance from the above-mentioned aberration reference position (referred to as S), as shown in FIG. 10A, for example, and is expressed by the following formula (6), where $W_{40}^{rms}$ denotes spherical aberration expressed in an RMS value; d denotes a distance from the above-mentioned aberration reference position S; n denotes an equivalent refractive index of the intermediate layer ML; and NA denotes a numerical aperture of the objective lens 160:

$$W_{40}^{rms} \approx \{1/48\sqrt{5}\}\{(n^2-1)/n^3\}NA^4 \cdot d \qquad (6)$$

Generally speaking, in order to stably reproduce information recorded in an optical disk, wavefront aberration should be reduced to less than 0.07λ in an RMS value where λ denotes a wavelength of a light beam, according to an empirical rule. Since it is necessary to consider wavefront aberration as a value including aberration of an objective lens, aberration caused due to possible inclination of an optical disk or such, it is necessary to control spherical aberration on the recording layer to not more than ½ of 0.07λ (=0.035λ).

As shown in FIG. 10A, assuming that positions at which the spherical aberration becomes 0.035λ are P1 and P2, a distance between P1 and P2 (referred to as T1) is expressed by the following formula (7):

$$T1=7.5n^3\lambda/\{(n^2-1)NA^4\} \qquad (7)$$

In other words, when no correction is carried out for spherical aberration, the upper limit value of the spacing between the recording layers is T1. There, P1 is assumed as being a position on the side of the objective lens.

Figure 10B:
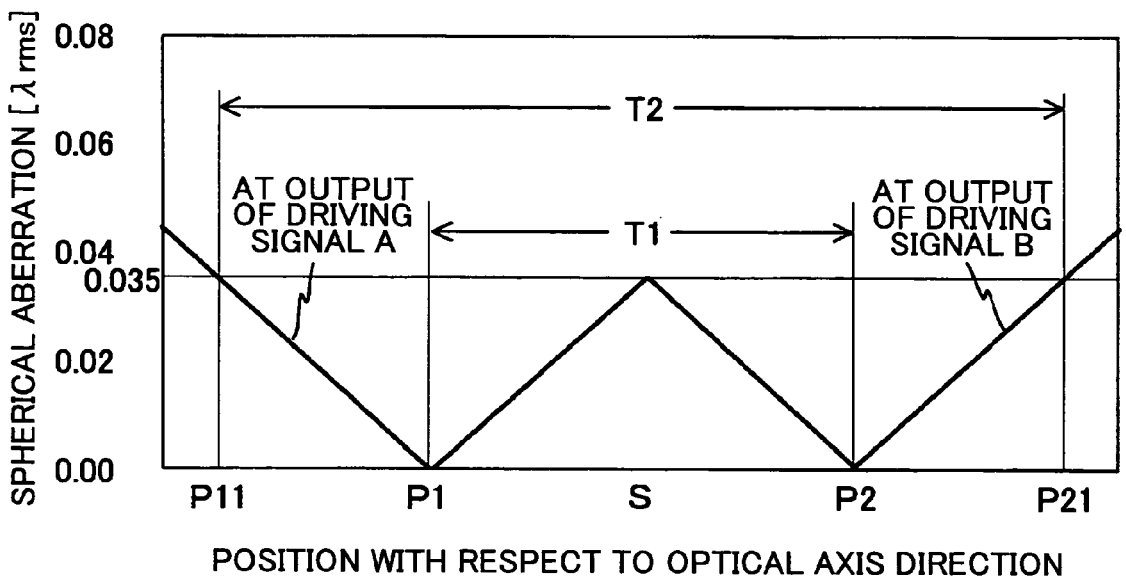

According to the present embodiment, as one example, as shown in FIG. 10B, a driving signal for controlling the lens spacing so that the spherical aberration on the position P1 may become approximately zero is determined as the above-mentioned driving signal A, while a driving signal for controlling the lens spacing so that the spherical aberration on the position P2 may become approximately zero is determined as the above-mentioned driving signal B. The respective driving signals are previously obtained from experimentation, simulation, theoretical calculation or such.

Accordingly, as shown in FIG. 10B, when the selected recording layer is the first recording layer M0, the driving signal A is output. Thereby, when the first recording layer M0 is located between the aberration reference position S and a position P11 shown, the spherical aberration becomes not more than 0.035λ. Similarly, when the second recording layer M1 is located between the aberration reference position S and a position P21 shown, the spherical aberration becomes not more than 0.035λ. That is, a thickness t of the intermediate layer ML should be not more than T2 expressed by the following formula (8):

$$T2 = 15n^3 \lambda / \{(n^2-1)NA^4\} \quad (8)$$

In this formula (8), λ=0.40 [μm]; n=1.623; and NA=0.65 are substituted, and as a result, T2=87 μm is obtained. This value is larger than the above-mentioned upper limit value 70 μm in the one-side two-layer DVD-ROM. Accordingly, it is possible to utilize a conventional manufacturing apparatus, and thus, it is possible to manufacture the one-side two-layer blue DVD at a reduced cost.

Further, a lower limit of the thickness t of the intermediate layer ML may be determined based on at least one of a capture range of the focus error signal and an output level of the light receiving device LD obtained when influence of inter-layer crosstalk is small. For example, as shown in FIG. 3 of 'PIONEER R&D Vol. 6, No. 2 (1996) by Yuki Kuribayasi et al., pages 62-72', if t≦45 μm, influence of inter-layer crosstalk may cause remarkable increase in jitter deterioration in the output signal of the light receiving device LD. Further, assuming that control error of the above-mentioned aberration correction lens system 156 as being approximately 5%, it is preferable that t≧45 μm.

Returning to FIG. 7, the motor control circuit 126 controls the spindle motor 122 and the seek motor 121 according to instructions given by the CPU 140.

In the buffer RAM 134, data (recording data) to be recorded in the optical disk 115, data (reproduced data) reproduced from the optical disk 115 or such is temporarily stored. Input or output of data in/from the buffer RAM 134 is managed by the buffer manager 137.

The encoder 125 takes recording data stored in the buffer RAM 134 via the buffer manger 37 based on instructions from the CPU 140, carries out data modulation, addition of error correction code or such, and generates a signal (writing signal) to be written in the optical disk 115. The thus-generated writing signal is output to the laser control circuit 124.

The laser control circuit 124 controls power of laser light emitted from the light source LD. For example, upon recording, a driving signal for the light source LD is generated by the laser control circuit 124 based on the above-mentioned writing signal, recording requirements, light emitting characteristics of the light source LD or such.

The interface 138 is a bi-directional interface with the host apparatus (for example, a personal computer), and conforms to a standard interface such as ATAPI (AT Attachment Packet Interface), SCSI (Small Computer System Interface), USB (Universal Serial Bus) or such.

In the flash memory 139, programs described in a code interpretable by the CPU 140, the above-mentioned driving signals for the lens driving device for the respective ones of the recording layers, the recording requirements, the light emitting characteristics in the light source LD and so forth are stored.

The CPU 140 controls operations of the respective parts/devices according to the programs stored in the flash memory 139, and also, writes data necessary for the control operations or such in the RAM 141.

Whether the selected recording layer is the first recording layer or the second recording layer is determined by the CPU 140 based on a designated address given. Accordingly, upon receiving a recording request or a reproduction request from the host apparatus, the CPU 140 notifies the SA controller 127d and the FC controller 127a of information concerning the selected recording layer.

As can be clearly seen from the above description, in the optical disk apparatus 120 according to the second embodiment, the CPU 140, the programs executed by the CPU 140, the SA controller 127d, the SA driver 127e and the aberration correction lens system 156 act as an aberration correcting part. Further, the reproduced signal processing circuit 128, the CPU 140 and the programs executed by the CPU 140 act as a processing device. All of or at least a part of the processing carried out by the CPU 140 according to the programs may be embodied by means of hardware instead.

As described above, in the optical disk apparatus 120 according to the second embodiment of the present invention, prior to actual access to the optical disk 115, the driving signal A is provided to the lens driving device when the selected recording layer is the first recording layer while the driving signal B is provided to the lens driving device when the selected recording layer is the second recording layer. Thereby, an aberration correction amount is switched in response to which of the recording layers becomes the selected recording layer. Then, even when the selected recording layer is any one of the recording layers, the spherical aberration can be controlled to not more than 0.035λ. Accordingly, the light spot having superior shape quality can be produced on the selected recording layer, and as a result, it is possible to carry out access to the large-recording-capacity optical disk having the plurality of recording layers, stably with high accuracy.

Further, in the optical disk 115 according to the embodiment of the present invention, when it is loaded in the optical disk apparatus 120, it is possible to control the spherical aberration to not more than 0.035λ whether the selected recording layer is the first recording layer M0 or the second recording layer M1. Further, since the spacing between the first recording layer M0 and the second recording layer M1 should be set as being not more than 87 μm, which is a not too strict value, an allowable range of the spacing between the first recording layer M0 and the second recording layer M1 (that is, the thickness of the intermediate layer ML) thus increases from that of the conventional case, it is possible to manufacture a product of the optical disk 215 at high yield with the use of a conventional manufacturing apparatus. Accordingly, it is possible to provide an optical disk having a large recording capacity at a reduced cost.

Further, in the above-described embodiment, the aberration correction lens system 156 is applied to correct the aberration. However, other than this way, the position of the collimator lens 152 may be shifted in the X-axis direction for the purpose of correcting, the aberration, instead, for example. In this case, a driving mechanism is newly needed to move the collimator lens 152. However, instead, the aberration correction lens system 156 becomes not necessary. Further, in this case, the SA driver 127e should output a driving signal for the newly provided driving mechanism.

Furthermore, in the above-described embodiment, the concave lens 156a is disposed on the light source side of the convex lens 156b. However, other than this way, rather the convex lens 156b may be disposed on the light source side of the concave lens 156a. That is, what is essential is the lens spacing.

Furthermore, in the above-described embodiment, instead of the aberration correction lens system 156, an electrooptic device such as a liquid crystal device having a refractive index controllable by means of an applied voltage, an optical device including an electrooptic crystal, or such may be employed. In this case, the SA driver 127e should output a voltage applied to the electrooptic device.

Furthermore, in the above-described embodiment, the information concerning the selected recording layer is notified of to the SA controller 127d from the CPU 140. However, instead, the CPU 140 may select the driving signal, and notifies the SA controller 127d of the selection result.

Further, in the above described embodiment, the numerical aperture of the objective lens 60 is 0.65. However, the objective lens 60 may have another numerical aperture.

Further, the above described embodiment is the optical disk apparatus which can carry out information recording and reproduction. However, instead, an optical disk apparatus according to the present embodiment may be an optical disk which can carry out at least information reproduction from among information recording, reproduction and deletion.

Figure 11A:
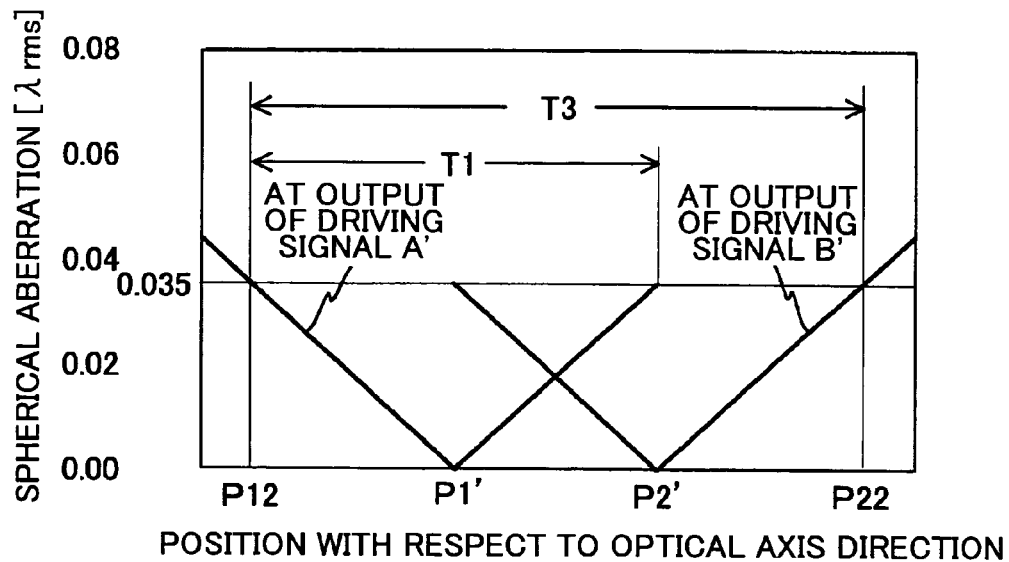
FIG. 11A illustrate a relationship between two types of driving signals and spherical aberration in a case where an aberration reference position is set at a position corresponding to a first recording layer.

According to the second embodiment of the present invention, setting is made such that the aberration reference position may be located at approximately the center of the intermediate layer ML with respect to the optical axis direction of the objective lens 160 as mentioned above. However, other than this way, for example, the aberration reference position may be set at a position corresponding to the first recording layer M0 or the second recording layer M1 instead, as a variant embodiment of the second embodiment. In the variant embodiment of the second embodiment where the aberration reference position is set at a position (referred to as P12) corresponding to the first recording layer M0, for example, as shown in FIG. 11A, setting is made such that a driving signal A' is output instead of the above-mentioned driving signal A while a driving signal B' is output instead of the above-mentioned driving signal B. The driving signal A' is a driving signal with which the spherical aberration at a position (referred to as P1') corresponding to '(⅓)t' (or (⅓)T3) toward the second recording layer M1 (P22) from the first recording layer M0 (P12) may become approximately minimum. The driving signal B' is a driving signal with which the spherical aberration at a position (referred to as P2') corresponding to '(⅔)t' (or (⅔)T3) toward the second recording layer M1 (P22) from the first recording layer M0 (P12) may become approximately minimum. As a result, it is possible to control the spherical aberration to not more than 0.035λ when the thickness of the intermediate layer ML is not more than T3 expressed by the following formula (9):

$$T3 = 11n^3\lambda/\{(n^2-1)NA^4\} \quad (9)$$

In this formula (8), λ=0.40 [μm]; n=1.623; and NA=0.65 are substituted, and as a result, T3=65 μm is obtained. This value is approximately equivalent to the above-mentioned upper limit value 70 μm of the one-side two-layer DVD-ROM. Accordingly, it is possible to utilize a conventional manufacturing apparatus, and thus, it is possible to manufacture the one-side two-layer blue DVD at a reduced cost. The same manner may be applied also in a case where the aberration reference position is set at a position P22 corresponding to the second recording layer M1.

Figure 11B:
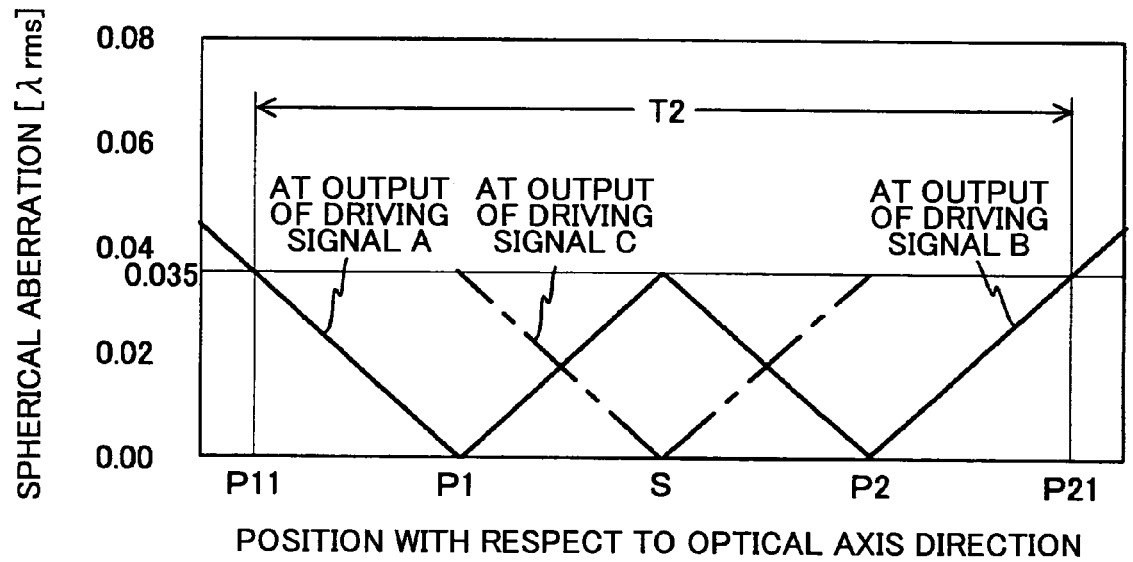
FIG. 11B illustrate a relationship between three types of driving signals and spherical aberration.

The optical disk apparatus 120 according to the second embodiment may be configured to further handle an optical disk having a single recording layer which is configured to have a light beam of approximately 400 nm applied thereto (referred to as 'single-layer blue DVD, hereinafter) as another variant embodiment of the second embodiment. In the another variant embodiment of the second embodiment, when a position corresponding to the recording layer of the single-layer blue DVD is located between the above-mentioned positions P1 and P2, it is possible to control the spherical aberration on the recording layer of the single-layer blue DVD to a low level as a result of outputting a driving signal C when the selected recording layer is this recording layer of the single-layer blue DVD. The driving signal C is a driving signal with which, as shown in FIG. 11B, the above-mentioned lens spacing is controlled (in other words, the lens spacing is returned to the original design value) so that the spherical aberration at the aberration reference position S may become approximately zero. That is, as candidates of the driving signal for the lens driving device, previously three driving signals (the driving signal A, the driving signal B and the driving signal C) are set. Then, any one of these three driving signals is output to the SA driver 127e in response to whether the relevant optical disk loaded is the single-layer blue DVD or the one-side two-layer blue DVD, and further, whether the selected recording layer is the first recording layer M0 or the second recording layer M1 when the one-side two-layer blue DVD is loaded, as mentioned above. Determination processing as to whether the currently mounted optical disk is the single-layer blue DVD or the one-side two-layer blue DVD is carried out by the CPU 140 normally when the optical disk is loaded in the optical disk apparatus.

Figure 12:
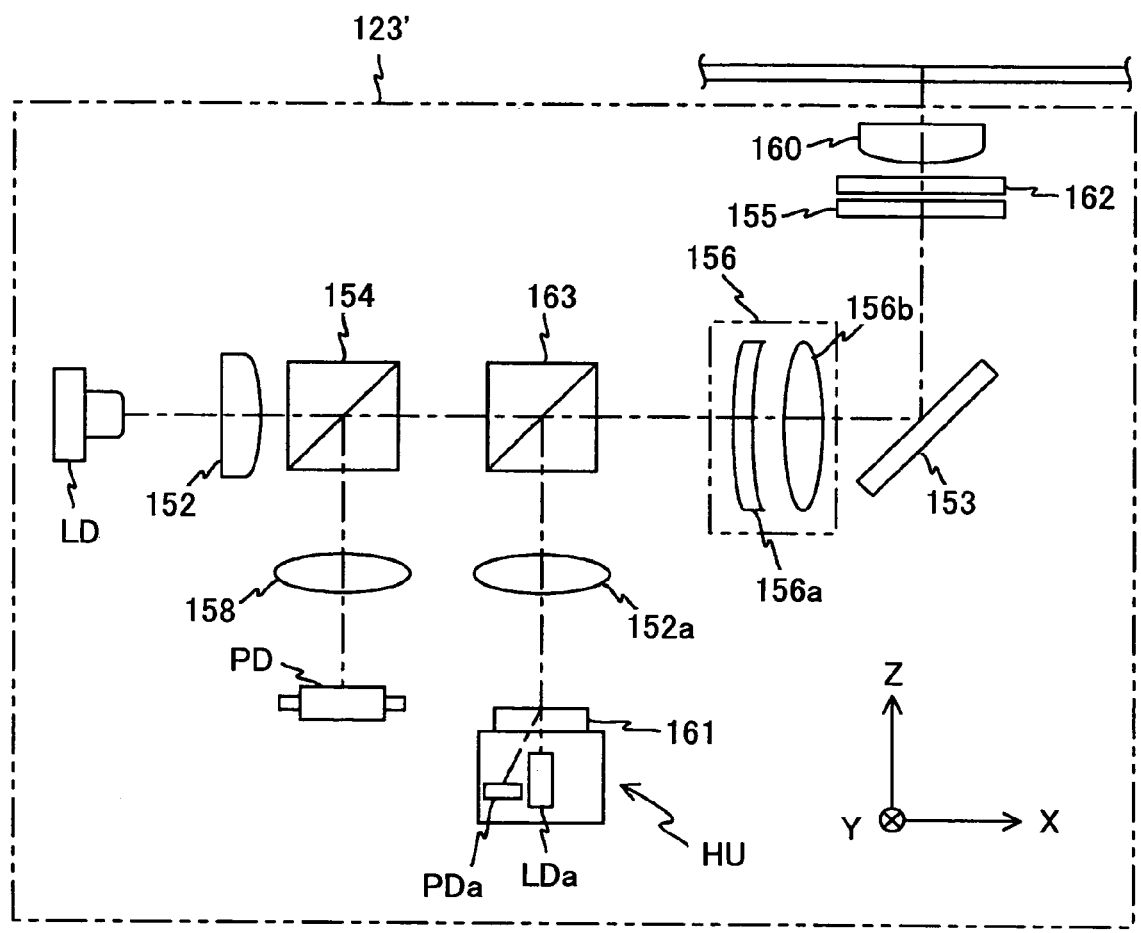
FIG. 12 illustrates a configuration of a two-wavelength optical pickup device.

Furthermore, the optical disk apparatus 120 according to the second embodiment may be configured to further handle an optical disk having two recording layers which is configured to have a light beam of approximately 660 nm (referred to as a 'red DVD light beam') applied thereto (referred to as 'one-side two-layer red DVD, hereinafter) as a further another variant embodiment of the second embodiment. In the further another variant embodiment of the second embodiment, instead of the optical pickup 123, an optical pickup 123' shown in FIG. 12, for example, is employed. The optical pickup 123' includes, as shown in FIG. 12, a hologram unit HU, a coupling lens 152a, a dichroic prism 163 and a phase correction plate 162. The numerical aperture of the objective lens 160 is 0.65 also for the red DVD light beam.

The dichroic prism 163 is disposed on a light path lying between the polarization beam splitter 154 and the aberration correction lens system 156, has high transmittance with respect to a light beam of the wavelength of approximately 400 nm (referred to as 'blue DVD light beam', hereinafter), and has high reflectance with respect to the red DVD light beam. Accordingly, almost all of the light beam coming from the polarization beam splitter 154 is transmitted by the dichroic prism 163. The coupling lens 152a is disposed on the −Z side of the dichroic prism 163, and the hologram unit HU is disposed on the −Z side of the coupling lens 152a.

The hologram unit HU includes a light source LDa emitting a red DVD light beam in linear polarization (S polarization there as one example); a light receiving device PDa; and a hologram 161. The light receiving device PDa has the same configuration as that of the light receiving device PD in the second embodiment. The hologram unit HU is disposed in such a manner that the maximum intensity emitting direction of the red DVD light beam emitted from the light source LDa may coincide with the +Z direction.

The phase correction plate 162 is disposed between the ¼ wavelength plate 155 and the objective lens 160, and cancels out spherical aberration occurring due to difference between the wavelengths of the blue DVD light beam and the red DVD light beam. For example, when the objective lens 160 is optimized for the blue DVD light beam, the phase correction plate 162 is set in such a manner that a phase distribution of the red DVD light beam transmitted by the phase correction plate 162 may be changed appropriately.

When the one-side two-layer blue DVD is loaded in the optical disk apparatus, a light beam is emitted from the light source LDa according to instructions given by the laser control circuit 124, which is then applied to the dichroic prism 163 via the hologram 161 and the coupling lens 152a. Almost all part of this light beam is reflected by the dichroic prism 163 in the +X direction, and then, is condensed on the selected recording layer of the one-side two-layer red DVD via the aberration correction lens system 156, the deflection prism 153, the ¼ wavelength plate 155, the phase correction plate 162 and the objective lens 160.

The red DVD light beam (referred to as a 'red DVD returning light beam', hereinafter) reflected by the selected recording layer of the one-side two-layer red DVD is applied to the hologram 161 via the objective lens 160, the phase correction plate 162, the ¼ wavelength plate 155, the deflection prism 153, the aberration correction lens system 156, the dichroic prism 163 and the coupling lens 152a. The red DVD returning light beam diffracted by the hologram 161 is then received by the light receiving device PDa.

Also in this case, the same as in the above-described second embodiment, in response to whether the selected recording layer is the first recording layer or the second recording layer, any one of the two driving signals (the driving signal A and the driving signal B) is output from the SA driver 127e.

Determination processing as to whether the currently mounted optical disk is the one-side two-layer red DVD or the one-side two-layer blue DVD is carried out by the CPU 140 normally when the optical disk is loaded in the optical disk apparatus. The determination result is then notified of to the circuits carrying out processing according to the relevant wavelength, such as the laser control circuit 124.

Further, the present invention is not limited to the above-described embodiments, and variations and modifications may be made without departing from the basic concept of the present invention claimed.

The present application is based on Japanese Priority Applications Nos. 2003-396448, 2004-064905 and 2004-064909, filed on Nov. 27, 2003, Mar. 9, 2004 and Mar. 9, 2004, respectively, the entire contents of which are hereby incorporated herein by reference.

What is claimed is:

1. An optical disk apparatus carrying out at least information reproduction from among information recording, information reproduction and information deletion on an optical disk having a plurality of recording layers, comprising: a light source; an optical system comprising an objective lens condensing a light beam from the light source on a recording layer selected from the plurality of recording layers of the optical disk, and leading a returning light beam reflected by said selected recording layer to a predetermined position; a photodetector disposed at said predetermined position and receiving the returning light beam; an aberration correcting part selecting any one of a plurality of aberration correction amounts previously set, according to the recording layer selected from the plurality of recording layers, and correcting the spherical aberration based on the aberration correction amount as the selection result; and a processing device carrying out at least the information reproduction from among information recording, information reproduction and information deletion with the use of the output signal of the photodetector; and wherein the optical disk includes a first recording layer and a second recording layer; and said aberration correcting part selects an aberration correction amount with which spherical aberration becomes approximately minimum at a position corresponding to (¼)t, where spherical aberration becomes approximately zero, from the first recording layer toward the second recording layer where t denotes a distance between the first recording layer and the second recording layer, when said selected recording layer is the first recording layer, while the aberration correcting part selects an aberration correction amount with which spherical aberration becomes approximately minimum at a position corresponding to (¾)t, where spherical aberration becomes approximately zero, from the first recording layer toward the second recording layer, when said selected recording layer is the second recording layer; and wherein said objective lens is set in such a manner that wavefront aberration may become approximately minimum at a position corresponding to (½)t from the first recording layer toward the second recording layer when the applied light beam is approximately parallel light; and wherein the following formula provides spherical aberration not more than 0.035 λrms:

$$t \leq 15n^3\lambda/\{(n^2-1)NA^4\}$$

where: n denotes a refractive index; λ denotes a wavelength of the light beam applied; and NA denotes a numerical aperture of the objective lens of the optical disk apparatus, and wherein λ=0.40 μm, n=1.623, NA=0.65, and t=87 μm.

2. The optical disk apparatus as claimed in claim 1, wherein said aberration correcting part comprises a positive lens and a negative lens disposed on a light path lying between the light source and the objective lens, and corrects the spherical aberration as a result of a distance between the positive lens and the negative lens being adjusted according to the selection result.

3. The optical disk apparatus as claimed in claim 1, wherein said aberration correcting part comprises a coupling lens disposed on a light path lying between the light source and the objective lens, and corrects the spherical aberration as a result of a position of the coupling lens with respect to an optical axis direction being adjusted according to the selection result.

4. The optical disk apparatus as claimed in claim 1, wherein said aberration correcting part comprises an electrooptic device having a refractive index distribution varying according to an applied voltage, disposed on a light path lying between the light source and the objective lens, and corrects the spherical aberration as a result of the refractive index distribution being adjusted according to the selection result; and wherein said electrooptic device comprises a liquid crystal device.

5. The optical disk apparatus as claimed in claim 1, wherein said aberration correcting part comprises an electrooptic device having a refractive index distribution varying according to an applied voltage, disposed on a light path lying between the light source and the objective lens, and corrects the spherical aberration as a result of the refractive index distribution being adjusted according to the selection result; and wherein said electrooptic device comprises an optical device including an electrooptic crystal.

6. An optical disk apparatus carrying out at least information reproduction from among information recording, information reproduction and information deletion on an optical disk having a plurality of recording layers, comprising: a light source; an optical system comprising an objective lens condensing a light beam from the light source on a recording layer selected from the plurality of recording layers of the optical disk, and leading a returning light beam reflected by said selected recording layer to a predetermined position; a photodetector disposed at said predetermined position and receiving the returning light beam; an aberration correcting part selecting any one of a plurality of aberration correction amounts previously set, according to the recording layer selected from the plurality of recording layers, and correcting the spherical aberration based on the aberration correction amount as the selection result; and a processing device carrying out at least the information reproduction from among information recording, information reproduction and information deletion with the use of the output signal of the photodetector; and wherein the optical disk includes a first recording layer and a second recording layer; and said aberration correcting part selects an aberration correction amount with which spherical aberration becomes approximately minimum at a position corresponding to (⅓)t, where spherical aberration becomes approximately zero, from the first recording layer toward the second recording layer where t denotes a distance between the first recording layer and the second recording layer, when said selected recording layer is the first recording layer, while the aberration correcting part selects an aberration correction amount with which spherical aberration becomes approximately minimum at a position corresponding to (⅔)t, where spherical aberration becomes approximately zero, from the first recording layer toward the second recording layer, when said selected recording layer is the second recording layer; and wherein said objective lens is set in such a manner that wavefront aberration may become approximately minimum at a position corresponding to one of the first recording layer and the second recording layer when the applied light beam is approximately parallel light; and wherein the following formula provides spherical aberration not more than 0.035 λrms:

$$t \leq 11 n^3 \lambda / \{(n^2-1)NA^4\}$$

where: n denotes a refractive index; λ denotes a wavelength of the light beam applied; and NA denotes a numerical aperture of the objective lens of the optical disk apparatus, and wherein λ=0.40 μm, n=1.623, NA=0.65, and t=65 μm.

7. The optical disk apparatus as claimed in claim 6, wherein said aberration correcting part comprises a positive lens and a negative lens disposed on a light path lying between the light source and the objective lens, and corrects the spherical aberration as a result of a distance between the positive lens and the negative lens being adjusted according to the selection result.

8. The optical disk apparatus as claimed in claim 6, wherein said aberration correcting part comprises a coupling lens disposed on a light path lying between the light source and the objective lens, and corrects the spherical aberration as a result of a position of the coupling lens with respect to an optical axis direction being adjusted according to the selection result.

9. The optical disk apparatus as claimed in claim 6, wherein said aberration correcting part comprises an electrooptic device having a refractive index distribution varying according to an applied voltage, disposed on a light path lying between the light source and the objective lens, and corrects the spherical aberration as a result of the refractive index distribution being adjusted according to the selection result; and wherein said electrooptic device comprises a liquid crystal device.

10. The optical disk apparatus as claimed in claim 6, wherein said aberration correcting part comprises an electrooptic device having a refractive index distribution varying according to an applied voltage, disposed on a light path lying between the light source and the objective lens, and corrects the spherical aberration as a result of the refractive index distribution being adjusted according to the selection result; and wherein said electrooptic device comprises an optical device including an electrooptic crystal.

* * * * *